United States Patent [19]

Horio et al.

[11] Patent Number: 5,165,595
[45] Date of Patent: Nov. 24, 1992

[54] AIR CONDITIONING SYSTEM FOR VEHICLES

[75] Inventors: Shinichi Horio, Nagoya; Takayoshi Kawai, Hoi, both of Japan

[73] Assignee: Nippondenso Co., Ltd., Kariya, Japan

[21] Appl. No.: 772,083

[22] Filed: Oct. 4, 1991

[30] Foreign Application Priority Data

Oct. 4, 1990 [JP] Japan ................................. 2-267788

[51] Int. Cl.$^5$ ........................................... G05D 23/00
[52] U.S. Cl. ................... 236/49.3; 237/2 A; 395/61
[58] Field of Search ............... 165/12, 16, 42; 236/49.3; 62/157; 395/61, 900

[56] References Cited

U.S. PATENT DOCUMENTS

| | | | |
|---|---|---|---|
| 4,408,712 | 10/1983 | Naganoma et al. | 236/49.3 |
| 4,538,760 | 9/1985 | Kobayashi | 237/2 A |
| 4,681,153 | 7/1987 | Uchida | 237/2 A |
| 4,757,944 | 7/1988 | Kagohata et al. | 237/2 A |
| 4,777,585 | 10/1988 | Kokawa et al. | 395/61 |
| 4,978,061 | 12/1990 | Ogihara et al. | 236/49.3 |
| 5,027,305 | 6/1991 | Tanaka et al. | 395/61 |

FOREIGN PATENT DOCUMENTS

| | | |
|---|---|---|
| 62-41128 | 9/1987 | Japan . |
| 63-312217 | 12/1988 | Japan . |
| 64-16416 | 1/1989 | Japan . |
| 64-22617 | 1/1989 | Japan . |
| 1-94015 | 4/1989 | Japan . |
| 2-20420 | 1/1990 | Japan . |

*Primary Examiner*—A. Michael Chambers
*Attorney, Agent, or Firm*—Cushman, Darby & Cushman

[57] ABSTRACT

An air conditioner system for an automotive vehicle is particularly adapted to insolation dependent correction of a discharge rate of the conditioning air in cold weather, such as in the winter so that an excessive flow rate of relatively cool air will never be discharged in response to insolation. The air conditioner system comprises a blower driver means for directing air passing an air heating means and/or cooling means toward a vehicular cabin, an ambient temperature detecting means for monitoring and detecting ambient air temperature outside of the vehicular cabin, an insolation detecting means for detecting the sun beam entering the interior space of the vehicular cabin, a warm-up state detecting means for detecting a warm-up condition in which a temperature of a conditioning air is to be discharged into the vehicular cabin, and a short period after initiation of discharging of conditioning air, an a control means for controlling the blower driver means for adjusting the discharge rate of the conditioning air into the vehicle cabin, the control means increasing the discharge rate according to an increase of intensity of the insolation and respnsive to the warm-up state detecting means detecting the warm-up condition, for disabling an increase of the discharge rate irrespective of an increase of the insolation intensity.

8 Claims, 12 Drawing Sheets

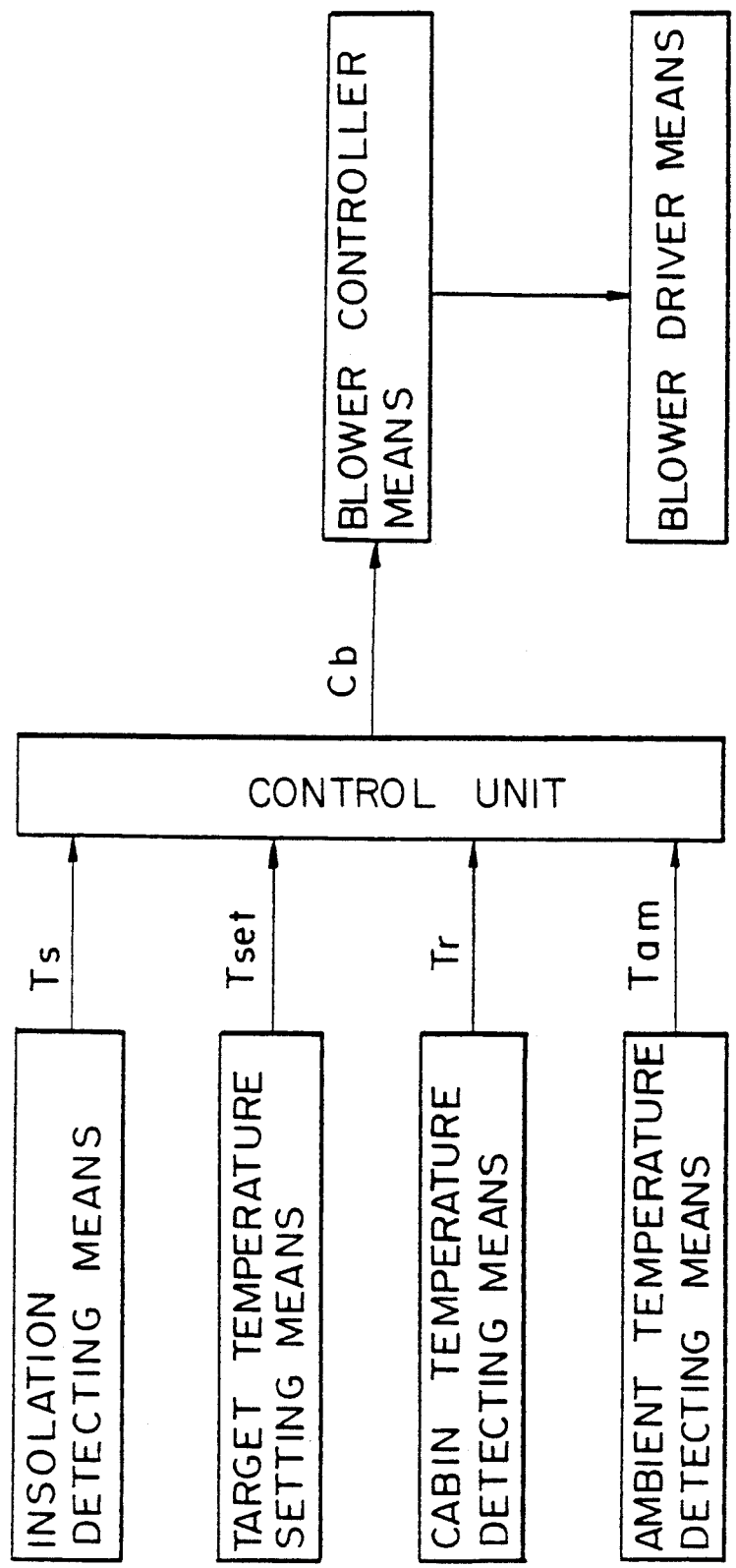

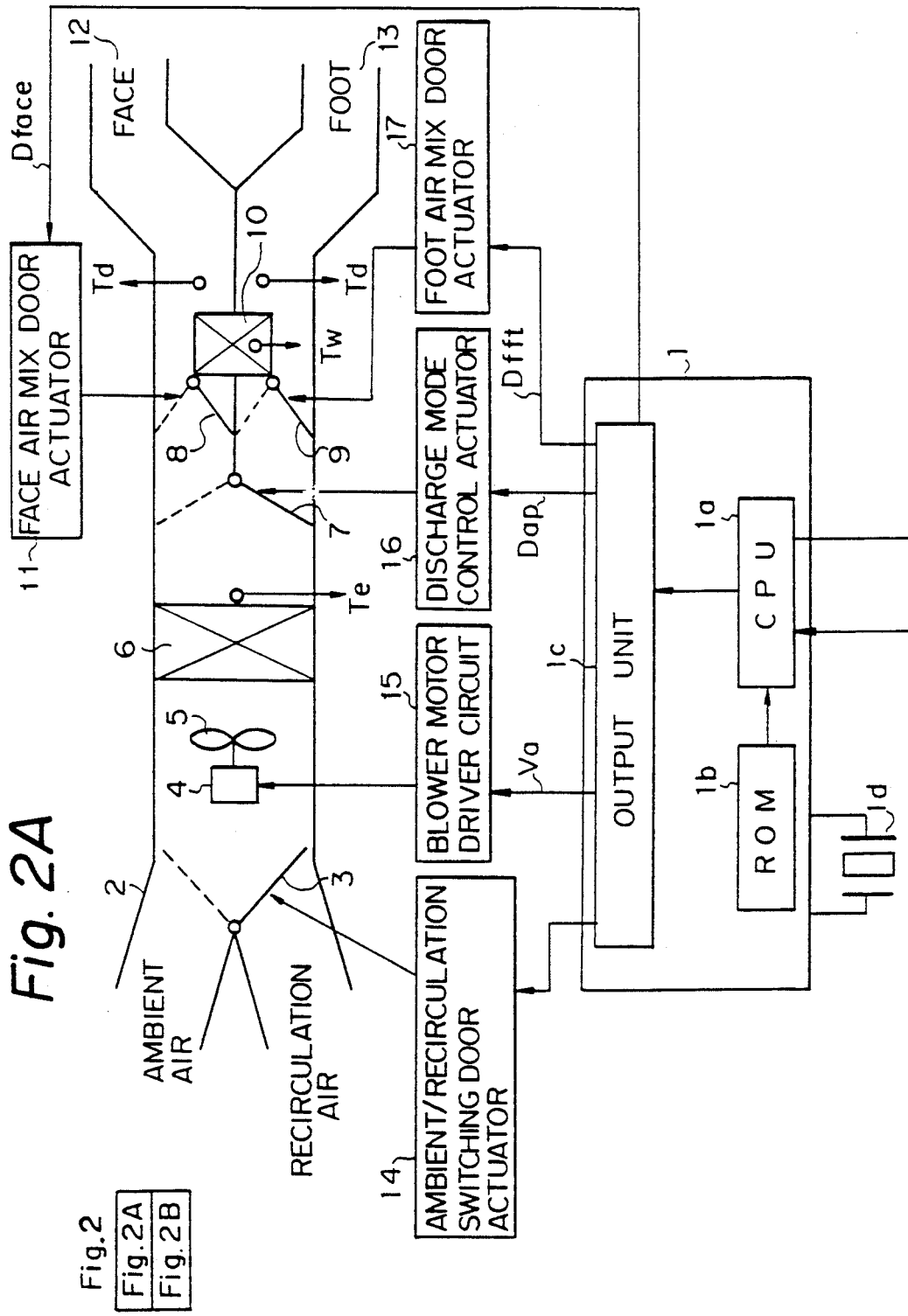

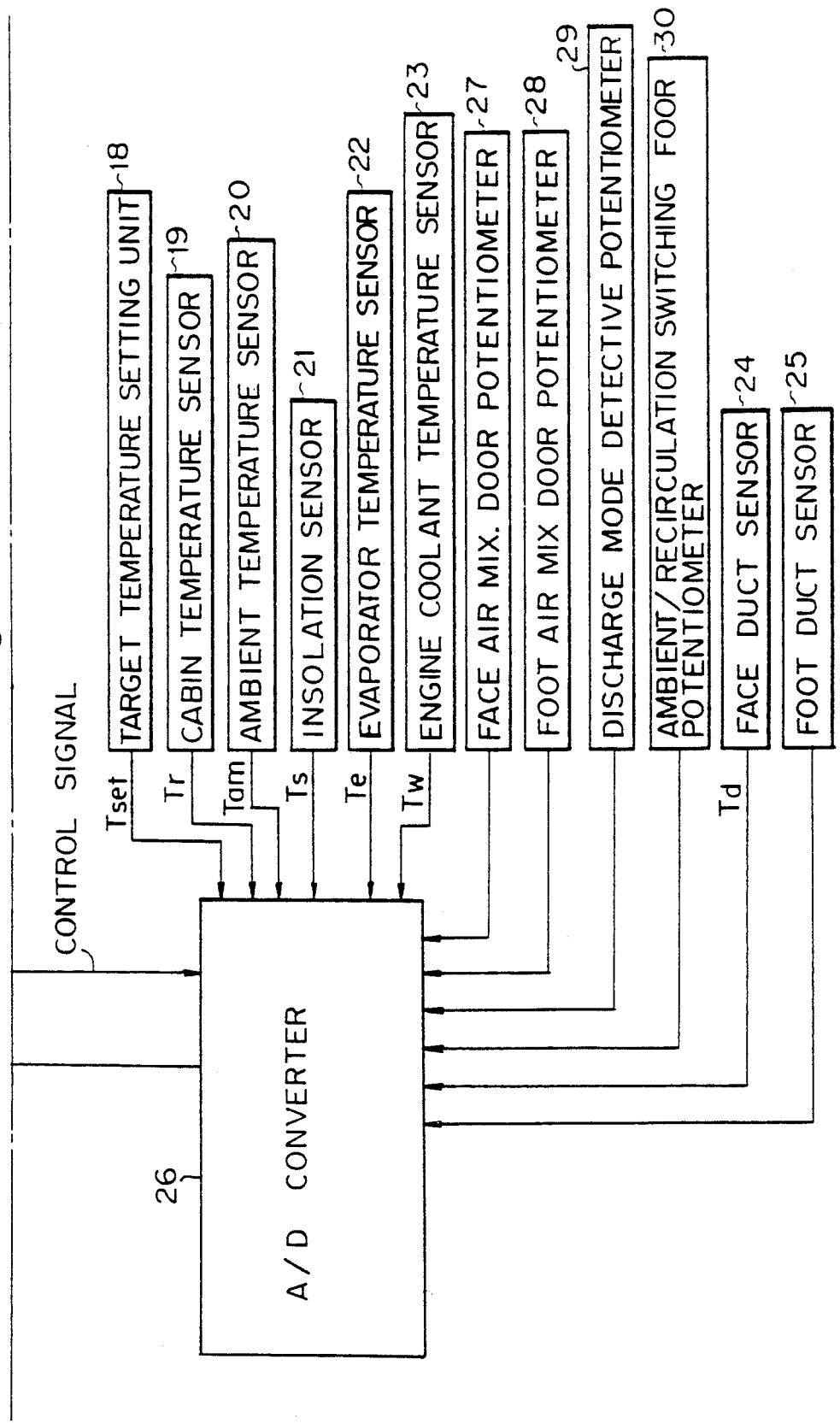

Fig. 8A
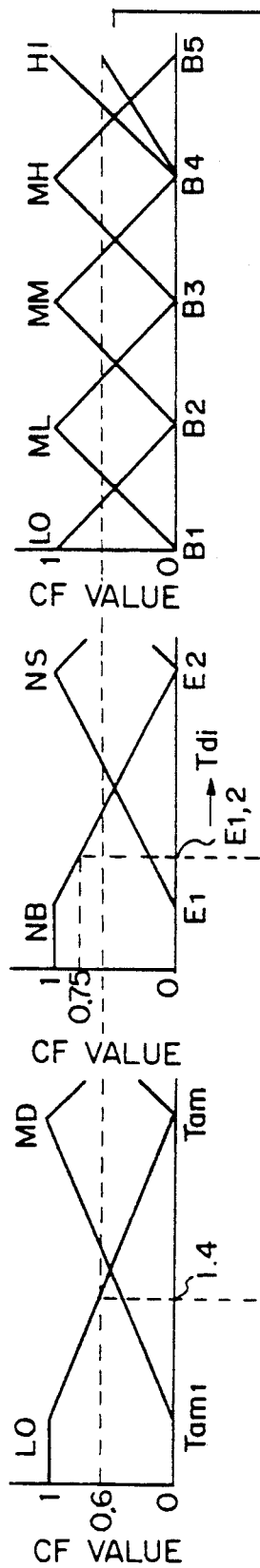
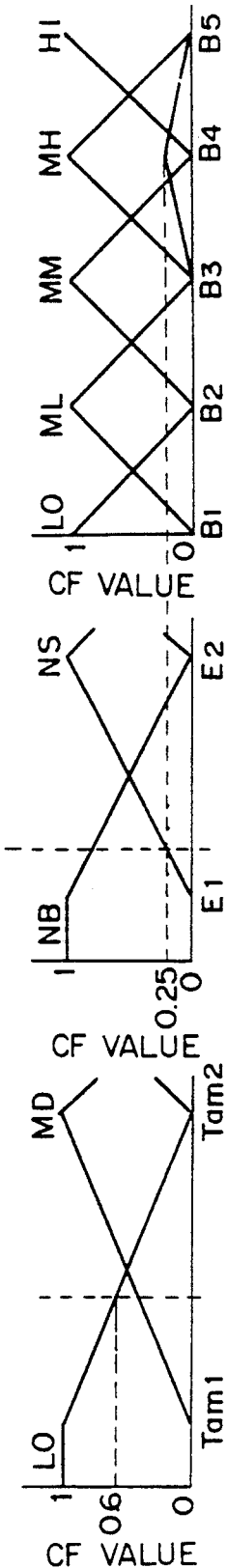

AIR CONDITIONING SYSTEM FOR VEHICLES

BACKGROUND OF THE INVENTION

1. Field of the Invention

The present invention relates generally to an air conditioning system for a vehicle. More specifically, the invention relates to an automotive air conditioning system for controlling blower speed for adjusting conditioning air discharge rate depending upon a temperature deviation between a cabin temperature and a set temperature, and ambient temperature and insolation.

2. Description of the Related Art

A typical construction of a blower control system for an automotive air conditioning system has been disclosed in Japanese Examined Patent Publication (Kokoku) No. 62-41128. The disclosed system is designed so as to increase blower speed when insolation is increased at an operational range, in which a deviation between a cabin temperature and a set temperature is small, for enhancement of feeling of the passengers in a vehicular cabin.

In such prior art, when the blower speed is limited so as not to become excessive during cooling at an extremely hot cabin condition, such as that upon entering after excessive exposure to insolation, or during cold conditions in the winter, an air conditioning discharge rate at a steady state may be insufficient to maintain a uniform temperature distribution within the cabin and cause substantial deviation between the cabin temperature and the set temperature by external disturbance of the thermal load In view of such a defect in the prior art, there is a prior invention filed under Japanese Patent Application No. 1-166529, that has been assigned to the common assignee of the present invention. The disclosure of the above-identified Japanese Patent Application is herein incorporated by reference for the sake of disclosure. The shown system is intended to suppress a noise level by lowering the conditioned air discharge rate during the transition state and maintain uniformity of temperature distribution within the cabin by increasing the conditioned air discharge rate during steady state operation. The shown air conditioning system includes a control system. The control system derives a demanded discharge air temperature on the basis of the set temperature, a cabin temperature, an ambient temperature and the insolation for a transition period, such as during the cooling down state or warming up state. The control system further derives a first blower voltage corresponding to the demanded discharge air temperature for the transition state. The control system also derives a demanded discharge air temperature for the steady state on the basis of the input information, i.e., set temperature, the cabin temperature, the ambient temperature and the insolation, and a second blower voltage corresponding to the demanded discharge air temperature for the steady state. The first and second blower voltages are compared so that a greater value of the blower voltages is selected and supplied to a blower drive control system as a blower control voltage.

Although the prior proposed systems as set forth above provide a certain level of gain in enhancement of the automotive air conditioning system, they are still unsatisfactory and can encounter some problems. For example, considering the operation of the above-mentioned air conditioning system in relatively cold weather, such as in the winter, when insolation is detected, the control system adjusts the demanded discharge air temperature Tao for a lower temperature due to the presence of insolation. Since the blower voltage is derived relative to the discharge air temperature Tao, the blower voltage can be accordingly lowered. For instance, assuming that the discharge air temperature Tao-blower voltage Vb characteristics is set as shown in FIG. 9 and further assuming that the demanded discharge air temperature is varied from the point A, in which no insolation is present, to the point B, in which the insolation is present, the blower voltage becomes the value corresponding to the demanded discharge air temperature Tao at the point B. Therefore, the blower speed is lowered to reduce the discharge rate of the conditioning air. At the same time, discharge air temperature control is performed in the per se known manner to adjust the air mix door open angle toward the cooler side for lowering the discharge air temperature according to the reduction of the demanded discharge air temperature Tac, as shown in FIG. 11. It is further assumed that the discharge mode of the conditioning air is maintained in FOOT (HEATER) mode, the reduced flow rate of the conditioning air with the lowered temperature should be discharged.

However, since the conventional control system is designed so as to increase the discharge rate of the conditioning air in response to insolation, insolation dependent correction for the blower speed is performed in response to insolation. By this, the discharge rate of the lowered temperature conditioning air is increased to be discharged through FOOT vents. This may create a cool feeling directly subjecting the occupants to the increased flow rate of the lowered temperature conditioning air.

Also, in the conventional air conditioning system, in a relatively warm environment, such as midday in the winter or spring or fall, insolation may provide a hot feeling for the passengers directly subjected to the sun beam. Despite the hot feeling due to insolation, the control system can maintain FOOT mode operation in certain environmental conditions with a reduced conditioning air discharge rate by the presence of insolation. In such occasions, the upper body of the passenger subject to an incoming sum beam, may not be satisfactorily cooled due to insufficient amount of conditioning air discharged into the cabin, and due to a discharge mode selected for directing conditioning air toward the lower body of the passenger. This clearly degrades the comfort of the passengers.

Such shortcoming is caused by the presence of the operational range of the air conditioning system in which a discharge mode is maintained in the FOOT mode while the demanded discharge air temperature Tao is lowered due to presence of insolation. Also, an algorithm for increasing the conditioning air discharge rate in a straightforward manner in response to the presence of insolation cannot optimize the operation of the air conditioning system over all environmental conditions, and serves to cause an uncomfortable feeling in certain environmental conditions such as that discussed above.

SUMMARY OF THE INVENTION

In view of the above-mentioned drawbacks in the prior art, it is an object of the present invention to provide an automotive air conditioning system which can optimally perform an insolation dependent correction of discharge rate of a conditioning air, particularly in the cold weather seasons, while maintaining a limited conditioning air discharge rate during a warming up state.

Another object of the invention is to provide an automotive air conditioning system which can also optimally select a discharge mode for switching between FOOT mode and BI-LEVEL mode so that the conditioning air can be discharged not only through FOOT vents but also through CHEST or FACE vents for effectively conditioning upper parts of a vehicular cabin, associated with variation of a demanded discharge air temperature, particularly at a relatively warm environment and during the presence of insolation.

In order to accomplish the above-mentioned and other objects, an air conditioner system for a vehicle comprises:

a blower driver means for directing air passing an air heating means and/or cooling means toward a vehicular cabin;

an ambient temperature detecting means for monitoring for detecting ambient air temperature outside of the vehicular cabin;

an insolation detecting means for detecting the sun beam entering into the interior space of the vehicular cabin;

a warm-up state detecting means for detecting a warm-up condition in which a temperature of a conditioning air to be discharged into the vehicular cabin, and a short period after the initiation of discharging of conditioning air; and a control means for controlling the blower driver means for adjusting a discharge rate of the conditioning air into the vehicular cabin, the control means increasing the discharge rate according to the increase of intensity of the insolation and responsive to the warm-up state detecting means detecting the warm-up condition, for disabling an increase of the discharge rate irrespective of an increase in the insolation intensity.

In a more practical construction, an air conditioner system for a vehicle comprises:

a blower driver means for driving a blower to direct a conditioning air of a controlled temperature toward a vehicular cabin;

a target temperature setting means for setting a target cabin temperature (Tset);

a cabin temperature detecting means for detecting a cabin temperature (Tr) in the interior space of the vehicular cabin;

an ambient temperature detecting means for detecting an ambient air temperature outside of the vehicular cabin;

a control means for deriving a temperature deviation (Tdi) between the target cabin temperature (Tset) set by the target temperature setting means and the cabin temperature (Tr) detected by the cabin temperature detecting means, deriving a blower control signal for adjusting blower speed and whereby adjusting the discharge rate of the conditioning air into the vehicular cabin on the basis of the temperature deviation (Tdi), the ambient temperature (Tam) detected by the ambient temperature detecting means, and an insolation intensity (Ts) detected by the insolation detecting means in such a manner that the value of the blower control signal is increased according to an increase of the insolation intensity, the control means detecting a warm-up state in which the cabin temperature Tam is lower than a predetermined temperature (HI) and the magnitude of the negative temperature deviation (Tdi) is greater than a predetermined negative deviation value, for limiting the blower control signal value irrespective of an increasing of the insolation intensity; and a blower voltage supply means for applying a blower voltage corresponding to the blower control signal for the blower driver means.

In the alternative construction, an air conditioner system for an automotive vehicle comprises:

a blower driver means for driving a blower for discharging a conditioning air with a controlled temperature and controlled discharge rate into the interior space of a vehicular cabin;

a target temperature setting means for manually setting a desired target temperature toward which the temperature of the interior space of the vehicular cabin is to be controlled;

a cabin temperature detecting means for detecting a temperature within the interior space of the vehicular cabin;

an ambient temperature detecting means for detecting an ambient air temperature external to the vehicular cabin;

an insolation detecting means for detecting insolation within the vehicular cabin;

a control means for deriving a temperature deviation between the target temperature and the cabin temperature, and a charge voltage to be applied to the blower driver means on the basis of the temperature deviation, the ambient temperature detected by the ambient temperature detecting means and the insolation intensity detected by the insolation detecting means, the control means increasing the charge voltage according to an increase of the insolation intensity, a voltage applying means for applying the charge voltage for controlling the discharge rate of the conditioning air;

an upper vent for discharging the conditioning air toward the upper portion of the interior space of the vehicular cabin;

a lower vent for discharging the conditioning air toward the lower portion of the interior space of the vehicular cabin; and a conditioning air distribution adjusting means for controlling a proportion of the conditioning air to be discharged through the upper vent and through the lower vent, the discharge rate of the conditioning air through the upper vent and the lower vent according to a command for driving the discharge rate through the upper vent and the lower vent, wherein the control means being detective of a predetermined condition, in which the ambient temperature (Tam) is higher than a predetermined temperature (LO) and the magnitude of the positive value of the temperature deviation is greater than a predetermined deviation (NS) for generating a command for the conditioning air distribution adjusting means to increase the charge voltage to be applied to the blower driver means according to an increase of the insolation intensity, and setting the increased discharge rate through the upper vent.

With the construction set forth above, the control means derives a temperature deviation between the target temperature set by the temperature setting means and the cabin temperature detected by the cabin temperature detecting means. The control means also derives the charge voltage to be applied to the blower driver means in terms of the temperature deviation, the insolation intensity detected by the insolation detecting means. The control means detects the condition, in which the ambient temperature is lower than the first predetermined temperature due to cold weather, such as in the winter, and the magnitude of the negative temperature deviation is greater than a predetermined negative deviation value to limit influence of the insolation for the conditioning air discharge rate.

With this construction, during the warm-up period immediately after starting operation of the air conditioner system in conjunction with starting up of the vehicle in the cold season, such as in the winter, an excess amount of the relatively cool conditioning air will never be discharged and will maintain the conditioning air discharge rate at a comfortable range.

According to the alternative construction, the air will never be discharged and will maintain the conditioning air discharge rate at a comfortable range.

According to the alternative construction, the air conditioner system includes a conditioning air distribution adjusting means for controlling a proportion of the conditioning air to be discharged through the upper vents and through the lower vents so that the conditioning air discharge rate through the upper vent is increased according to an increase of the intensity of the conditioning air.

The control means in the air conditioner system according to the invention detects the ambient temperature higher than the second predetermined temperature, such as midday in the winter, or spring or fall, after a given period from initiation of operation, and when the temperature deviation is reduced across the negative predetermined deviation to increase the charge voltage for the blower driver means according to an increase of the insolation. At this time, at least the discharge rate of the conditioning air to be discharged through the upper vent is increased. By this, the hot feeling due to presence of the insolation at the upper body of the passenger can be compensated for assure comfort.

As set forth above, according to the present invention, for example, if the sun beam enters the vehicular cabin at start up of the vehicle and thus start up of the air conditioner system, since the ambient temperature is lower than the first predetermined temperature and the temperature deviation is substantial because of the short period after initiation of the air conditioner operation, a correction based on the intensity of insolation is minimized or, in the alterative effected for reducing the blower voltage for assuring prevention of an increase of the discharge of air of a relatively low temperature.

Therefore, even when the sun beam enters the interior space of the vehicular cabin during the warm-up period, in which the negative temperature deviation is substantially large, a cold feeling discomforting the passenger will never occurr because of the prevention of an increase of the discharge rate of the relatively cool conditioning air.

Furthermore, in the alternative embodiment of the invention, for example, after a relatively long period from start up of the vehicle and start up of the air conditioner system, in which the temperature deviation is smaller than the negative predetermined deviation, and a relatively low angle sun beam enters the interior space of the vehicle in the day time in the winder and/or spring or fall, the charge voltage is increased according to an increase of the insolation intensity since the ambient temperature should be higher than the second predetermined temperature and the temperature deviation is relatively small. Also, according to an increase of the conditioning air discharge rate, a proportion of the conditioning air to be discharged through the upper vent is increased. This is particularly effective for cooling the upper body of the passenger who is subjected to irradiation of sum beams and thus experiences a feeling. This can be satisfactorily compensated for by increasing the discharge rate of the conditioning air through the upper vent.

BRIEF DESCRIPTION OF THE DRAWINGS

The present invention can be more fully understood from the detailed description given herebelow and from the accompanying drawings of the preferred embodiments of the invention, which, however, should not limit the invention to the specific embodiments but are for the purpose of explanation and illustration only.

In the drawings:

FIG. 1 is a schematic block diagram of an air conditioner control system according to the present invention;

FIGS. 2A and 2B are a block diagram of the preferred embodiment of the air conditioner control system according to the invention;

FIGS. 8A and 8B are a explanatory illustration showing example of fuzzy predication of the blower voltage in the preferred process of the present invention;

DESCRIPTION OF THE PREFERRED EMBODIMENT

Figure 3:
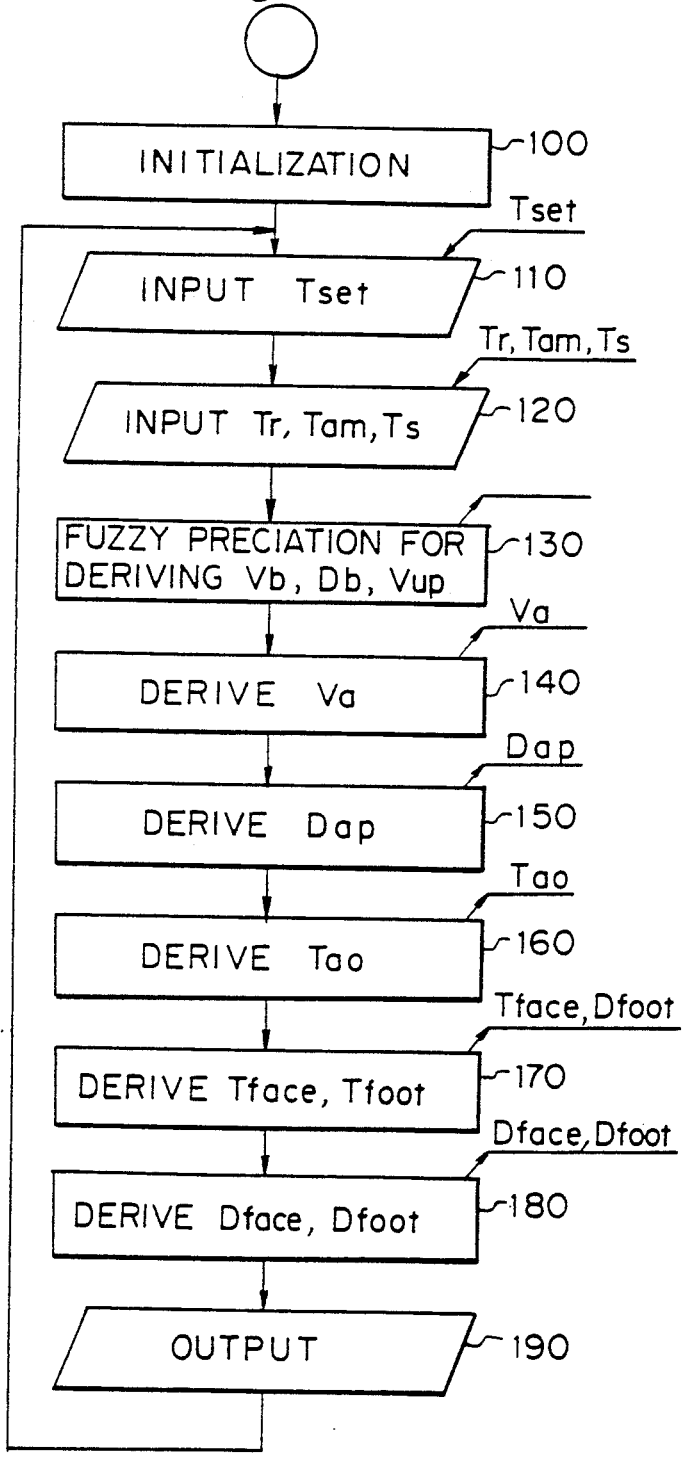
FIG. 3 is a flowchart showing a main routine of an air conditioner control program to be executed by the preferred embodiment of the air conditioner control system of FIG. 2.

Following discussion will be given for the preferred embodiment of an air conditioner control system, according to the invention, in terms of application to independent control of a conditioning air temperature and a discharge rate as well as selection of FACE and FOOT vents to discharge a conditioning air in various discharge modes.

Referring now to FIG. 1, the general concept of the present invention will be discussed in order to establish an understanding of the outline of the invention so as to facilitate better understanding of the subsequent detailed discussion for the preferred embodiment. As seen from FIG. 1, an air conditioner control system, according to the present invention, includes a control unit CU which may comprise a microprocessor programmed to perform various air conditioner controls, such as a blower speed control, vent door control for switching discharge modes, air mix door control for adjusting a temperature of a conditioning air to be discharged, and so forth. In the particular embodiment, the vent door control is performed for switching discharge modes between FACE (cooler) mode and FOOT (heater) mode across BI-LEVEL mode.

In order to perform control operations, the control unit CU receives various air conditioner control parameters. For instance, in the particular embodiment, the control unit CU is connected to an insolation detecting means IDM which monitors intensity of sun beam and provides an insolation indicative data Ts representative thereof, a cabin temperature detecting means CTDM which monitors a temperature within a vehicular cabin and provides a cabin temperature indicative data Tr, and an ambient temperature detecting means ATDM which monitors an ambient air temperature outside of the vehicular cabin and provides an ambient temperature indicative data Tam. The control unit CU is also connected to a target temperature setting means TTSM which is manually operable for setting a desired target cabin temperature and provides a set temperature indicative data Tset. The control unit CU processes these input data for deriving a temperature deviation Tdi between the cabin temperature Tr and the set target temperature. Based on the temperature deviation Tdi, the ambient air temperature Tam and the insolation intensity Ts, the control unit performs a control operation for controlling a blower speed for adjusting discharge air flow rate, the air mix door position for adjusting the conditioning air temperature discharged through vents, and the vent door positions for selectively discharging the conditioning air through the FACE vents and/or FOOT vents.

The control unit CU is generally responsive to presence of insolation for increasing blower speed and whereby increasing the discharge rate of the conditioning air so as to compensate for an increase of the heat load due to insolation. The control unit CU also discriminates an operational mode of the air conditioner system between cooling mode and heating modes by comparing the ambient air temperature with a cooler/heater criterion HI. The control unit CU further compares the temperature deviation Tdi with a preset warm-up mode criterion NS when a heating mode operation of the air conditioner system is detected, so as to limit the blower speed irrespective of an increase of the insolation intensity during a warm-up mode operation.

The control unit CU thus derives a blower speed optimal at the instantaneous environmental condition to provide a blower control signal Cb to a blower controller means BCM. The blower controller means BCM is responsive to the blower control signal Cb to apply a blower voltage Vb corresponding to the blower control signal to a blower driver means BDM for driving the blower at the revolution speed corresponding to the blower control signal.

The feature and advantages of the present invention will become more clear from the detailed description of the preferred embodiment given herebelow.

FIG. 2 shows the preferred embodiment of the air conditioner control system according to the present invention. An air conditioner duct 2 has a ambient-/recirculation switching damper 3 for selectively communicating the duct to an ambient air inlet and a cabin air inlet. A cooling unit 6 which comprises an evaporator associated forming a part of refrigerant circulation circuit including a compressor driven by an automotive internal combustion engine as a prime mover of the vehicle, is disposed within the air conditioner duct 2 in the vicinity of the air inlet. A blower 5 is disposed within the air conditioner duct 2 upstream of the cooling unit 6 for forcing air introduced through the ambient air inlet and/or the cabin air inlet. A conditioning air distribution damper 7 is also disposed within the air conditioner duct 2 downstream of the cooling unit 6 for adjusting a proportion of the conditioning air to be discharged through FACE vents 12 and through FOOT vents 13. A heater core 10, in which an engine coolant as a heat transfer medium circulates for heating air flowing therethrough, is disposed downstream of the conditioning air distribution damper 7. Air mix doors 8 and 9 are provided for the heater core for adjusting a proportion of the volume of the conditioning air flowing through a FACE branch to the FACE vents 12 and a FOOT branch to the FOOT vents 13, to be introduced into the heater core 10. Air mixing is thus performed for adjusting the temperature of the conditioning air to be discharged through the FACE vents 12 and the FOOT vents 13 by adjusting a proportion of the volume of the cool air and hot air.

The ambient/recirculation switching damper 3 is associated with a ambient/recirculation door actuator 14. The actuator 14 thus adjusts the angular position of the ambient/recirculation switching damper 3 and whereby adjusts the proportion of the induction rate of the ambient air and the cabin air. The blower 5 is associated with a blower motor 5 to be driven at a controlled revolution speed for adjusting the air flow rate through the air conditioner duct 2. The blower motor 5 is connected to a blower driver circuit 15 which supplies a controlled blower driving voltage for adjusting the revolution speed of the blower motor and thus adjusting the blower speed.

The air mix door 8 is associated with a FACE air mix door actuator 11 which adjusts the angular position of the air mix door 8 for adjusting the hot air proportion in the conditioning air to be discharged through the FACE vents 12. Similarly, the air mix door 9 is associated with a FOOT air mix door actuator 17 which adjusts the angular position of the air mix door 9 for adjusting hot air in the conditioning air to be discharged through the FOOT vents 13. Also, the conditioning air distribution damper 7 is connected to a discharge mode control actuator 16 which adjusts the angular position of the conditioning air distribution damper for selecting a proportion of the conditioning air to be discharged through the FACE vent and the FOOT bent and whereby switching a discharge mode between FACE mode, BI-LEVEL mode and FOOT mode.

The ambient/recirculation door actuator 13, the blower driver circuit 15, the FACE and FOOT air mix door actuators 11 and 17 and the discharge mode control actuator 16 are connected to a control unit 1. The control unit 1 includes an analog-to-digital (A/D) converter 26 for converting various information input in analog formats into digital data which can be handled by an electronic digital processing unit, such as microprocessor or microcomputer. The control unit 1 also has a central processing unit (CPU) 1a, a read-only memory (ROM) 1b, in which various fuzzy rules and membership functions necessary for use in fuzzy predication discussed later and other programs and data necessary for performing various control operations. The control unit 1 also has an output unit 1c connected to the above-mentioned actuators and driver circuits as external control loads for outputting control signals, and a crystal oscillator 1d for generating a reference clock for enabling the CPU to perform required data processing operations.

The A/D converter 26 is connected to a target temperature setting unit 18 which is operable for entry of a desired vehicular cabin temperature as a target temperature Tset and produces a set temperature indicative signal, a cabin temperature sensor 19 which monitors a vehicular cabin temperature Tr and produces a cabin temperature indicative signal, an ambient temperature sensor 20 which monitors ambient air temperature Tam and produces an ambient temperature indicative signal, and an insolation sensor 21 for monitoring intensity of a sun beam Ts hereafter referred to as "insolation intensity" and produces an insolation indicative signal. In order to provide additional control parameters, an evaporator temperature sensor 22 for monitoring a temperature Te around the evaporator 6 to produce an evaporator temperature indicative signal, an engine coolant temperature sensor 23 for monitoring a temperature Tw in a radiator to produce an engine coolant temperature indicative signal, a FACE duct sensor 24 for monitoring a discharge air temperature of the conditioning air discharged through the FACE vents 12, and a FOOT duct sensor 25 for monitoring a discharge air temperature of the conditioning air discharged through the FOOT vents 13 are connected to the A/D converter 26.

In addition, the A/D converter 26 is connected to a FACE air mix door potentiometer 27 which monitors the position of the FACE air mix door actuator 11 to produce a FACE air mix door position indicative signal, a FOOT air mix door potentiometer 28 which monitors the position of the FOOT air mix door actuator 17 to produce a FOOT air mix door position indicative signal, a discharge mode detective potentiometer 29 which monitors the position of the discharge mode control actuator 16 to produce a discharge mode indicative signal, and an ambient/recirculation switching door potentiometer 30 which monitors the position of the ambient/recirculation switching actuator 14 to produce an induction mode indicative signal. The A/D converter 26, in turn, receives a timing control signal from the CPU 1a governing reading and writing timing and multiplexing so as to provide the digital format data derived from and representative of the input signals set forth above.

With the hardware construction set forth above, the control unit 1 performs various air conditioner control operations for optimizing operation of the air conditioner at the environmental condition and operating condition represented by the input signals for the A/D converters.

FIG. 3 shows the process of blower voltage control performed by the shown embodiment of the air conditioner control system of FIG. 1. The shown routine forms a part of an air conditioner control program. The shown routine is initiated in response to turning ON of a main power switch, such as an ignition switch, to start execution and is cyclically or periodically executed. At a step 100, initialization is performed for setting an initial state of the overall control system.

At a step 110, the set temperature data Tset is input from the A/D converter 26. The set temperature data Tset is derived on the basis of the set temperature indicative signal of the target temperature setting unit 18. Therefore, the set temperature data Tset represents the desired target cabin temperature.

At a step 120, a cabin temperature data Tr, an ambient temperature data Tam and an insolation intensity data Ts input from the A/D converter 26. These data are derived by A/D conversion based on the cabin temperature indicative signal from the cabin temperature sensor 19, the ambient temperature indicative signal from the ambient temperature sensor 20 and the insolation indicative signal from the insolation sensor 21.

At a step 130, a temperature deviation Tdi is derived based on the cabin temperature Tr and the set temperature Tset. Based on the temperature deviation Tdi and the ambient temperature Tam, fuzzy predication is performed for deriving a blower voltage Vb and a distribution Db of discharge rate through the FACE vents 12 and the FOOT vents 13, in the environmental condition where no insolation is present, and increasing magnitude Vup of the blower voltage during the presence of the insolation.

At a step 140, by adding the blower voltage Vb and the blower voltage increasing magnitude Vup derived at the step 130, a target blower voltage Va is derived. The target blower voltage Va is derived by:

$$Va = Vb + Vup \quad (1)$$

The target blower voltage Va thus derived is supplied to the blower driver circuit 15.

At a step 150, based on the results obtained through the steps 130 and 140, a target conditioning air distribution damper position Dap is calculated by the following equation:

$$D_{ap} = \frac{(V_b \times D_b + V_{up})}{V_a} \quad (2)$$

At a step 160, a demanded discharge air temperature Tao in the condition where no insolation is present, is derived on the basis of the cabin temperature Tr, the set temperature Tset and the ambient temperature Tam by the following equation:

$$Tao = Kset \times Tset - Kr \times Tr - Kam \times Tam + C \quad (3)$$

wherein Kset, Kr, Kam and C are gain values.

At a step 170, a discharge air temperature Tface for the conditioning air to be discharged through the FACE vents 12 and a discharge air temperature Tfoot for the conditioning air to be discharged through the FOOT vents 13 are calculated by the following equations:

$$Tface = MIN(Tao, Tset) + \Delta t \quad (4)$$

$$Tfoot = MAX(Tao, 35° C.) \quad (5)$$

Here, an insolation dependent correction value $\Delta t$ can be obtained, the a function taking the insolation intensity Ts and the ambient temperature Tam as parameters.

At a step 180, a target FACE air mix door open degree Dface is derived on the basis of the discharge air temperature Tface obtained from the equation (4). Also a target FOOT air mix door open degree Dfoot is derived on the basis of the discharge air temperature Tfoot obtained from the equation (5).

At a step 190, respective target values Va, Dap, Dface, Dfoot are output to the blower motor driver circuit 15, the discharge mode control actuator 16, the FACE air mix door actuator 11 and the FOOT air mix door actuator 17.

The steps 110 through 190 are repeated cyclically or periodically for continuous control of the operation of the air conditioner system for optimization of the operation of the air conditioner system in relation to the instantaneous environmental and operational conditions.

The control for the target blower voltage is thus performed as set forth above. In the shown process, further discussion will be given for the method for performing predication according to the fuzzy logic, which is performed in the step 130 of FIG. 3.

At first, discussion will be made for the membership function stored in the ROM 1b.

FIGS. 6(a) to 6(f) show membership functions to be used in the fuzzy predication. In the respective charts shown in FIGS. 6(a) to 6(f), the axis of abscissas represent input and output values and the axis of ordinatei represent certainty factors (CF) values corresponding to the relevant input and output values.

Figure 6A:
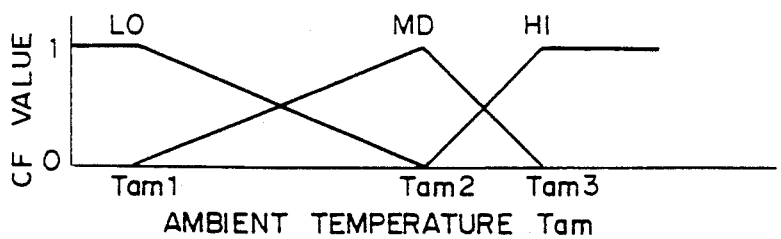
FIG. 6(a) is a chart showing a membership function associated with an ambient air temperature.

FIG. 6(a) shows the membership function associated with the ambient temperature Tam. In the shown example, the fuzzy aggregate is classified into three stage aggregates, i.e. Low: LO, Medium: MD and High: HI. With the membership functions of respective classes of fuzzy aggregates, membership function for the ambient temperature Tam is established.

Fuzzy parameters belonging in each fuzzy aggregate are set relative to the membership function of each fuzzy aggregate in the domain defined by the fuzzy aggregate as shown in FIG. 6(a) and the CF values within the domain.

Figure 6B:
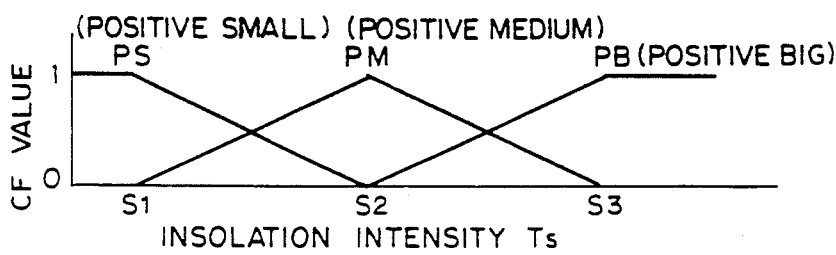
FIG. 6(b) is a chart showing a membership function associated with an insolation.

FIG. 6(b) shows a characteristic chart of the membership function associated with the insolation intensity Ts. The fuzzy aggregate is classified into three classes, i.e. Positive Small: PS, Positive Medium: PM and Positive Big: PB. Overall membership function of the insolation intensity Ts is established with the membership functions of respective classes of aggregates.

Fuzzy parameters belonging in each fuzzy aggregate are set relative to the membership function of each fuzzy aggregate in the domain defined by the fuzzy aggregate as shown in FIG. 6(b) and the CF values within the domain.

Figure 6C:
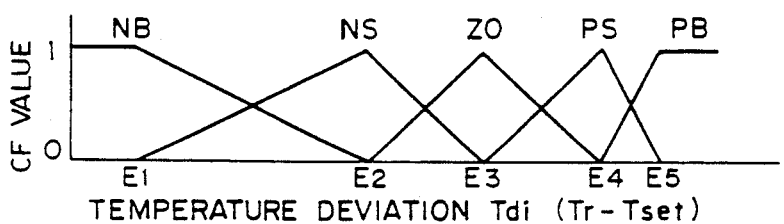
FIG. 6(c) is a chart showing a membership function associated with a temperature deviation between a cabin temperature and a set temperature.

FIG. 6(c) shows the membership function associated with the temperature deviation Tdi. Fuzzy aggregate of the temperature deviation Tdi (= Tr − Tset) is classified into five classes of fuzzy aggregates, i.e. Negative Big: NB, Negative Small: NS, Zero: ZO, Positive Small: PS and Positive Big: PB. Overall membership function of the temperature deviation Tdi is established with the membership functions of respective classes of aggregates.

Fuzzy parameters belonging in each fuzzy aggregate are set relative to the membership function of each fuzzy aggregate in the domain defined by the fuzzy aggregate as shown in FIG. 6(c) and the CF values within the domain.

Figure 6D:
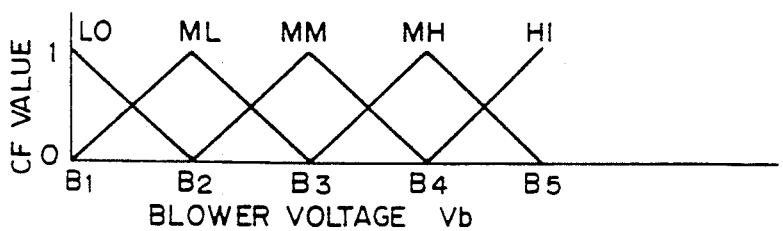
FIG. 6(d) is a chart showing a membership function associated with a blower voltage in an environmental condition where no insolation presents.

FIG. 6(d) shows the membership function associated with the blower voltage Vb. Fuzzy aggregate of the blower voltage Vb is classified into five classes of fuzzy aggregates, i.e. Low: LO, Medium Low: ML, Medium: MM, Medium High: MH and High: HI. Overall membership function of the blower voltage Vb is established with the membership functions of respective classes of aggregates.

Fuzzy parameters belonging in each fuzzy aggregate are set relative to the membership function of each fuzzy aggregate in the domain defined by the fuzzy aggregate as shown in FIG. 6(d) and the CF values within the domain.

Figure 6E:
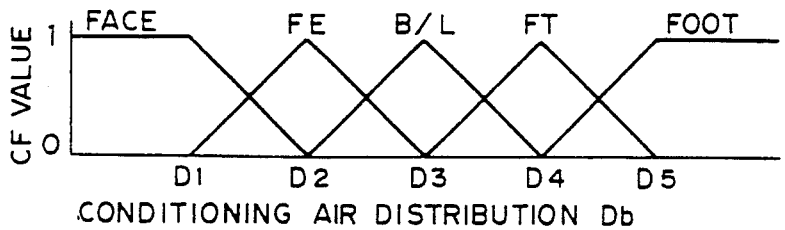
FIG. 6(e) is a chart showing a membership function associated with discharge modes of a conditioning air.

FIG. 6(e) shows the membership function associated with the conditioning air distribution Db as derived at the step 130 as set forth above. Fuzzy aggregate of the blower voltage Vb is classified into five classes of fuzzy aggregates, i.e. FACE mode (FACE), FACE side BI-LEVEL mode (FE), BI-LEVEL mode (B/L), FOOT side BI-LEVEL mode (FT) and FOOT mode (FOOT). Overall membership function of the conditioning air distribution Db is established with the membership functions of respective classes of aggregates.

Fuzzy parameters belonging in each fuzzy aggregate are set relative to the membership function of each fuzzy aggregate in the domain defined by the fuzzy aggregate as shown in FIG. 6(e) and the CF values within the domain.

Figure 6F:
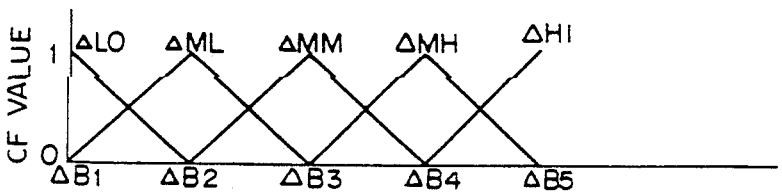
FIG. 6(f) is a chart showing a membership function associated with variation ratio of the blower voltage in an environmental condition where insolation present.
Figure 7:
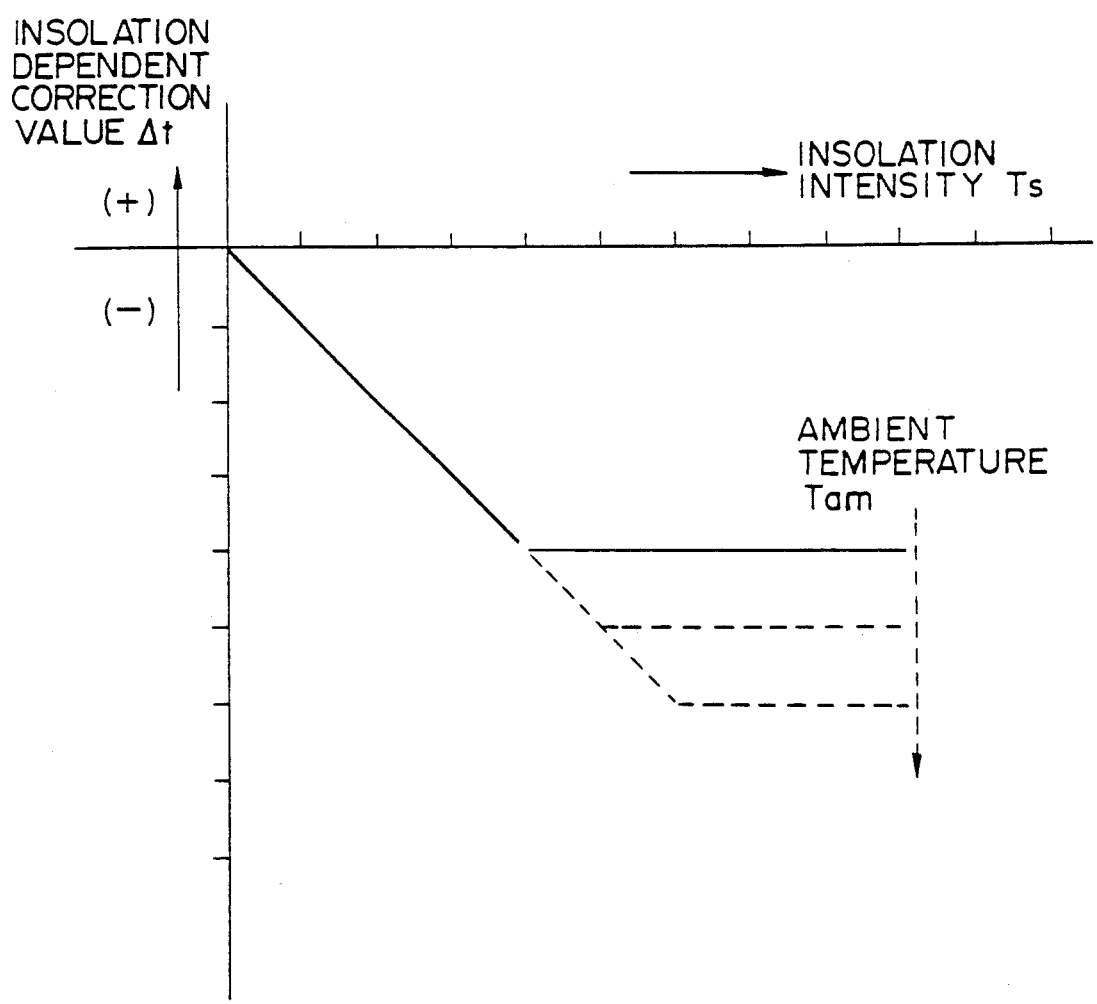
FIG. 7 is a chart showing a characteristic function of an insolation dependent correction value taking an intensity of insolation and an ambient temperature.

FIG. 6(f) shows the membership function associated with the blower voltage increasing magnitude Vup under the presence of the insolation. Fuzzy aggregate of the blower voltage increasing magnitude Vup is classified into five classes of fuzzy aggregates, i.e. Low: $\Delta$LO, Medium Low: $\Delta$ML, Medium: $\Delta$MM, Medium High: $\Delta$MH and High: $\Delta$HI. Overall membership function of the blower voltage increasing magnitude Vup is established with the membership functions of respective classes of aggregates. It should be noted that $\Delta$LO represents substantially no increasing magnitude of the blower voltage.

Fuzzy parameters belonging in each fuzzy aggregate are set relative to the membership function of each fuzzy aggregate in the domain defined by the fuzzy aggregate as shown in FIG. 6(f) and the CF values within the domain.

Next, fuzzy rule stored in ROM 1b will be discussed. According to the shown embodiment, five fuzzy rules are established as shown in the following tables I to V on the basis of the foregoing membership functions of the ambient temperature Tam, the insolation intensity Ts, temperature deviation Tdi, the blower voltage Vb, the conditioning air distribution Db and the blower voltage increasing magnitude Vup.

Table I shows a fuzzy rule for the blower voltage Vb established in terms of the ambient temperature Tam and the temperature deviation Tdi. Table II shows a fuzzy rule for the conditioning air distribution Db established in terms of the ambient temperature Tam and the temperature deviation Tdi. In the tables I and II, a1, a2, ... and b1, b2, ... in the parenthesis represents identification number of the corresponding predicate.

TABLE I

(Rule Table for Vb)

| Tdi = Tr − Tset | Tam LO | MD | HI |
|---|---|---|---|
| NB | HI(a1) | MH(a5) | MM |
| NS | MH(a2) | ML(a7) | LO |
| ZO | MM(a3) | LO(a8) | LO(a13) |
| PS | ML | ML(a9) | ML |
| PB | LO | MM(a10) | HI(a15) |

TABLE II

(Rule Table for Db)

| Tdi = Tr − Tset | Tam LO | MD | HI |
|---|---|---|---|
| NB | FOOT(b1) | FOOT | B/L |
| NS | FOOT | FT | FE |
| ZO | FOOT(b3) | B/L(b8) | FACE(b13) |
| PS | FOOT | FE(b9) | FACE(b14) |
| PB | FT | FACE(b10) | FACE(b15) |

On the other hand, the tables III to V show fuzzy rules of the blower voltage increasing magnitude Vup in terms of the insolation intensity Ts, the temperature deviation Tdi and the ambient temperature Tam. Table III is the fuzzy rule table to be used for deriving the blower voltage increasing magnitude Vup in cold weather, such as winter, in which the ambient temperature Tam becomes LO. The table IV is the fuzzy rule table to be used for deriving the blower voltage increasing magnitude Vup in medium temperature weather, such as spring or fall, in which the ambient temperature Tam becomes MD. Finally, the table V is the fuzzy rule table for use in derivation of the blower voltage increasing magnitude Vup in hot weather, such as in the summer, in which the ambient temperature Tam becomes HI.

TABLE III

(Rule Table of Vup while Tam = LO)

| Tdi = Tr − Tset | Ts PS | PM | PB |
|---|---|---|---|
| NB | $\Delta$LO(c1) | $\Delta$LO | $\Delta$LO |
| NS | $\Delta$LO | $\Delta$LO | $\Delta$ML |
| ZO | $\Delta$LO | $\Delta$ML(c8) | $\Delta$MM |
| PS | $\Delta$LO | $\Delta$ML | $\Delta$MH |
| PB | $\Delta$LO | $\Delta$MM | $\Delta$MH |

TABLE IV

(Rule Table of Vup while Tam = MD)

| Tdi = Tr − Tset | Ts PS | PM | PB |
|---|---|---|---|
| NB | $\Delta$LO | $\Delta$LO | $\Delta$LO |
| NS | $\Delta$LO | $\Delta$ML | $\Delta$ML |
| ZO | $\Delta$LO | $\Delta$ML(d8) | $\Delta$MH |
| PS | $\Delta$LO | $\Delta$MM(d9) | $\Delta$MH |
| PB | $\Delta$LO | $\Delta$MM(d10) | $\Delta$HI |

TABLE V

(Rule Table of Vup while Tam = HI)

| Tdi = Tr − Tset | Ts PS | PM | PB |
|---|---|---|---|
| NB | $\Delta$LO | $\Delta$ML | $\Delta$MM |
| NS | $\Delta$LO | $\Delta$ML | $\Delta$MH |
| ZO | $\Delta$LO | $\Delta$MM | $\Delta$MH(e13) |
| PS | $\Delta$LO | $\Delta$MM | $\Delta$HI(e14) |
| PB | $\Delta$LO | $\Delta$MH | $\Delta$HI(e15) |

Here, the fuzzy rule in the foregoing table I can be generally predicated as follows:

[Fuzzy Rules]

| | | |
|---|---|---|
| (a1) | IF (Tam = LO & Tdi = NB) | THEN (Vb = HI) |
| (a2) | IF (Tam = LO & Tdi = NS) | THEN (Vb = MH) |
| (a3) | IF (Tam = LO & Tdi = ZO) | THEN (Vb = MM) |
| (a4) | IF (Tam = LO & Tdi = PS) | THEN (Vb = ML) |
| (a5) | IF (Tam = LO & Tdi = PB) | THEN (Vb = LO) |
| (a6) | IF (Tam = MD & Tdi = NB) | THEN (Vb = MH) |
| (a7) | IF (Tam = MD & Tdi = NS) | THEN (Vb = ML) |
| (a8) | IF (Tam = MD & Tdi = ZO) | THEN (Vb = LO) |
| (a9) | IF (Tam = MD & Tdi = PS) | THEN (Vb = ML) |
| (a10) | IF (Tam = MD & Tdi = PB) | THEN (Vb = MM) |
| (a11) | IF (Tam = HI & Tdi = NB) | THEN (Vb = MM) |
| (a12) | IF (Tam = HI & Tdi = NS) | THEN (Vb = LO) |
| (a13) | IF (Tam = HI & Tdi = ZO) | THEN (Vb = LO) |
| (a14) | IF (Tam = HI & Tdi = PS) | THEN (Vb = ML) |
| (a15) | IF (Tam = HI & Tdi = PB) | THEN (Vb = HI) |

When the conditioning air distribution Db of the foregoing table II is predicated, they will become similar to those set out above.

On the other hand, the blower voltage increasing magnitude Vup in the cold weather, as shown in the foregoing table III, can be predicated as follows:

| | | |
|---|---|---|
| (c1) | IF (Tam = LO & Tdi = NB & Ts = PS) | THEN (Vup = $\Delta$LO) |
| (c2) | IF (Tam = LO & Tdi = NS & Ts = PS) | THEN (Vup = $\Delta$LO) |
| (c3) | IF (Tam = LO & Tdi = ZO & Ts = PS) | THEN (Vup = $\Delta$LO) |
| (c4) | IF (Tam = LO & Tdi = PS & Ts = PS) | THEN (Vup = $\Delta$LO) |
| (c5) | IF (Tam = LO & Tdi = PB & Ts = PS) | THEN (Vup = $\Delta$LO) |
| (c6) | IF (Tam = LO & Tdi = NB & Ts = PM) | THEN (Vup = $\Delta$LO) |
| (c7) | IF (Tam = LO & Tdi = NS & Ts = PM) | THEN (Vup = $\Delta$LO) |
| (c8) | IF (Tam = LO & Tdi = ZO & Ts = PM) | THEN (Vup = $\Delta$ML) |
| (c9) | IF (Tam = LO & Tdi = PS & Ts = PM) | THEN (Vup = $\Delta$ML) |
| (c10) | IF (Tam = LO & Tdi = PB & Ts = PM) | THEN (Vup = $\Delta$MM) |
| (c11) | IF (Tam = LO & Tdi = NB & Ts = PB) | THEN (Vup = $\Delta$LO) |
| (c12) | IF (Tam = LO & Tdi = NS & Ts = PB) | THEN (Vup = $\Delta$ML) |
| (c13) | IF (Tam = LO & Tdi = ZO & Ts = PB) | THEN (Vup = $\Delta$MM) |
| (c14) | IF (Tam = LO & Tdi = PS & Ts = PB) | THEN (Vup = $\Delta$MH) |
| (c15) | IF (Tam = LO & Tdi = PB & Ts = PB) | THEN (Vup = $\Delta$MH) |

It should be appreciated that the fuzzy rules for the blower voltage increasing magnitude Vup in the medium temperature weather, e.g. in the spring or fall, of the foregoing table IV and in the hot weather, e.g. in the summer, of the foregoing table V, can be predicated in the similar manner as that set out above.

Respective of the fuzzy rules shown above reflect the following algorithm.

(With respect to Table II)

In the foregoing table II, when the ambient temperature Tam is MD and thus higher than the second predetermined temperature LO, and if the temperature deviation Tdi becomes greater than the predetermined second negative deviation (e.g. NS) and thus becomes Tdi=ZO, the conditioning air distribution Db representative of the discharge mode becomes BI-LEVEL (B/L) to permit discharging of the conditioning air through both of the FACE and FOOT vents 12 and 13.

As can be normally appreciated, after a warm-up period from initiation of operation of the air conditioner system in response to start up of the vehicle and thus the cabin temperature is adjusted to be close to the set temperature so that the temperature deviation is negative but greater than the predetermined negative deviation closer to zero. If the ambient temperature rises to a relatively warm temperature, such as that around midday in the winter, and thus becomes MD, the discharge mode is switched into BI-LEVEL for providing conditioning air through the FACE vents 12 to cool the upper body of the passengers subjected irradiation of the sun beams.

(with respect to the Tables III and IV)

In relatively low temperature weather, such as winter, early spring or late fall, the ambient temperature Tam tends to become lower than the predetermined first temperature, e.g. HI and rather becomes LO. In a period immediately after start up of the vehicle, the cabin temperature should be maintained substantially lower than the set target temperature. In such a situation, the temperature deviation Tdi becomes greater in the negative and thus the negative value of the temperature deviation Tdi can be smaller than the predetermined negative deviation (e.g. NS) and classified as NB. In such a case, even when the insolation intensity is increased in order of PS, PM and PB, the blower voltage increasing magnitude Vup in relation to the insolation intensity is maintained at ΔLO and thus limited.

Similarly, even for environmental conditions, in which the ambient temperature Tam is lower than the first predetermined temperature HI and held at MD, the blower voltage increasing magnitude Vup in relation to the insolation intensity Ts is maintained to be ΔLO. By this, since the discharge rate of the conditioning air should not be increased even at the presence of the insolation during a warm-up period, the passenger will never be subjected to an increased discharge rate of relatively cool air to thereby give a cold feeling.

Process of fuzzy predication perfomed using the fuzzy rules of the tables I through V and the membership functions as set forth above, at the step 130 in FIG. 3 will be discussed hereinbelow.

Figure 4:
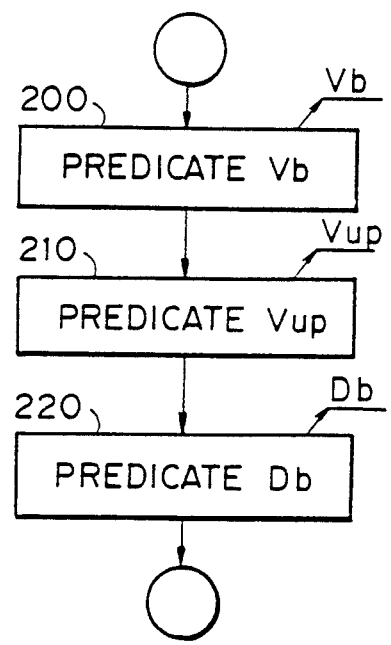
FIG. 4 is a flowchart showing a sub-routine to be executed in a process of a step 130 in the main routine of FIG. 3.

Fuzzy predication is performed in terms of the blower voltage Vb and the blower voltage increasing magnitude Vup and the conditioning air distribution Db in the step 130. The process is illustrated in FIG. 4. In the process of FIG. 4, at a step 200, the blower voltage Vb in the condition where no insolation is present, is derived by fuzzy predication. At a step 210, the blower voltage increasing magnitude Vup is derived by fuzzy predication. At a step 220, the conditioning air distribution Db under the absence of the insolation is derived by fuzzy predication.

Figure 5:
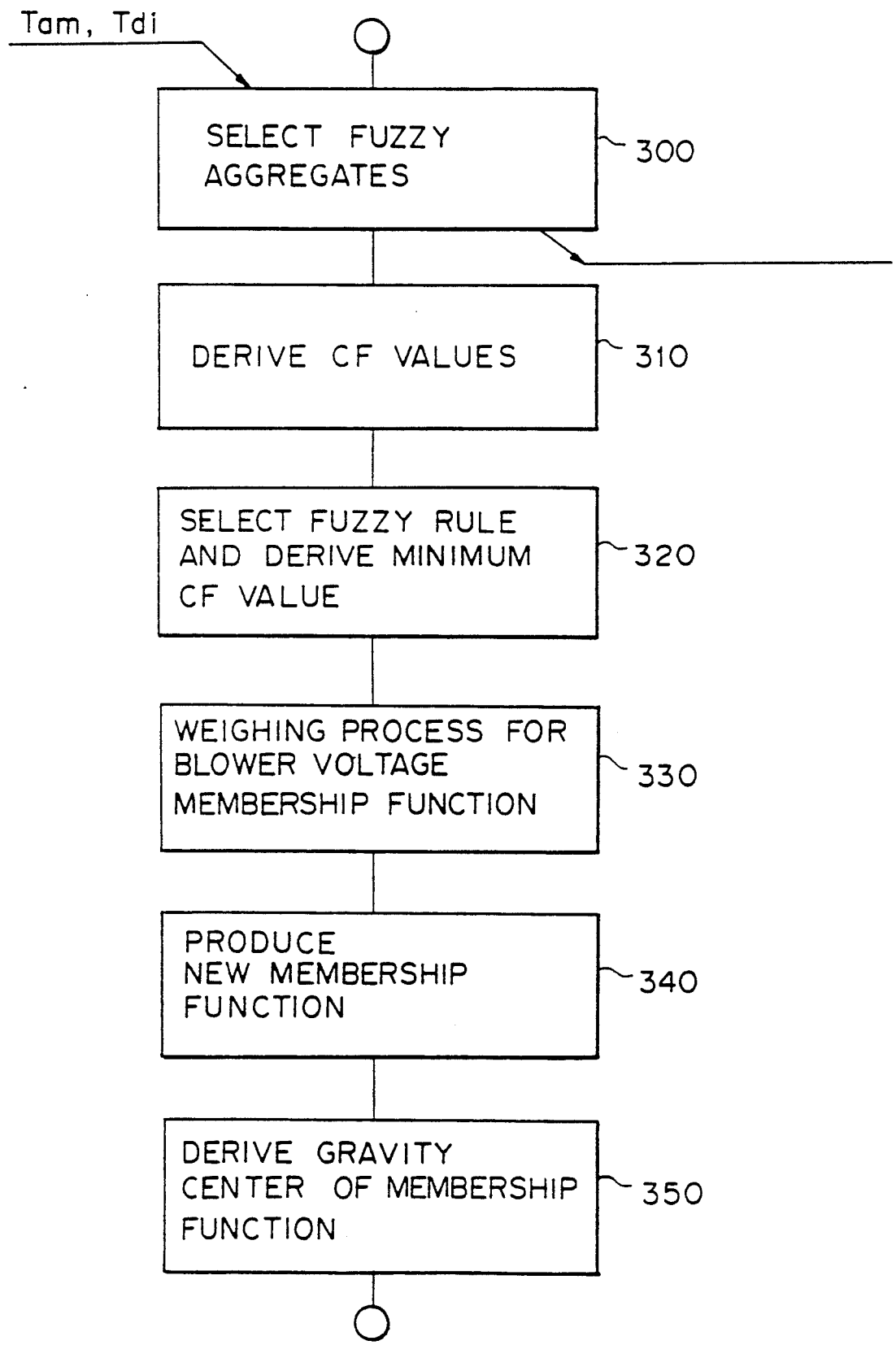
FIG. 5 is a flowchart showing a sub-routine to perform predication according to fuzzy logic in a process of a step 200 in the main routine of FIG. 3.

Process of fuzzy predication performed for deriving the blower voltage Vb is shown in FIG. 5 in a form of flowchart. In FIG. 5, at a step 300, the fuzzy aggregates in which the input parameters (fuzzy parameters) of the ambient temperature Tam and the temperature difference Tdi belong, are selected on the basis of the set target temperature Tset input at the step 110 of FIG. 3, and the vehicular environmental condition, i.e. the ambient temperature Tam, the cabin temperature Tr and so forth input at the step 120 of FIG. 3.

At a step 310, the CF values are derived with respect to respective fuzzy aggregates selected at the step 300.

At a step 320, the fuzzy rules adapted to the fuzzy aggregates in which the input parameters belong, are identified. With respect to each of the fuzzy rules identified as adapted to the selected fuzzy aggregates, the CF value of the temperature deviation Tdi and the CF value of the ambient temperature Tam are compared to set the smaller one as a minimum certainty value CFMIN.

At a step 330, using the last term of the selected fuzzy rules, weighing process with the minimum certainty values CFMIN for the membership functions of the corresponding blower voltage Vb is performed. In practice, the weighted membership function relating to the blower voltage Vb is calculated using the minimum certainty values CFMIN of respective fuzzy aggregates.

At a step 340, new membership function relating to the blower voltage Vb is established by forming a summed aggregate overlaying all of the membership functions weighted with respect to each of the fuzzy rules.

At a step 350, a gravity center value G of the membership function newly established at the step 340 is derived. The gravity center value G thus derived is set as the blower voltage Vb.

It should be appreciated that manner of calculation used for deriving the gravity center is to equally divide the blower voltage Vb into 9 points, for example from 13 V to 5 V, and to calculate weighing average values with respect to each of the divided 9 points, for permitting high speed processing and simplicity. Practical process is performed by the following equation:

$$G = \frac{\Sigma(V_b \times CF)}{\Sigma(CF)} \quad (6)$$

In the foregoing equation (6), the blower voltage Vb and the CF values are the blower voltage and CF value at each of the above-mentioned points.

The fuzzy predication performed at the steps 210 and 220 for deriving the blower voltage increasing magnitude Vup and the conditioning air distribution Db can be processed in a substantially similar manner as that discussed above.

Further details of the fuzzy predication in the process of FIG. 5 for deriving the blower voltage Vb will be discussed with an example shown in FIG. 8.

Figure 8B:
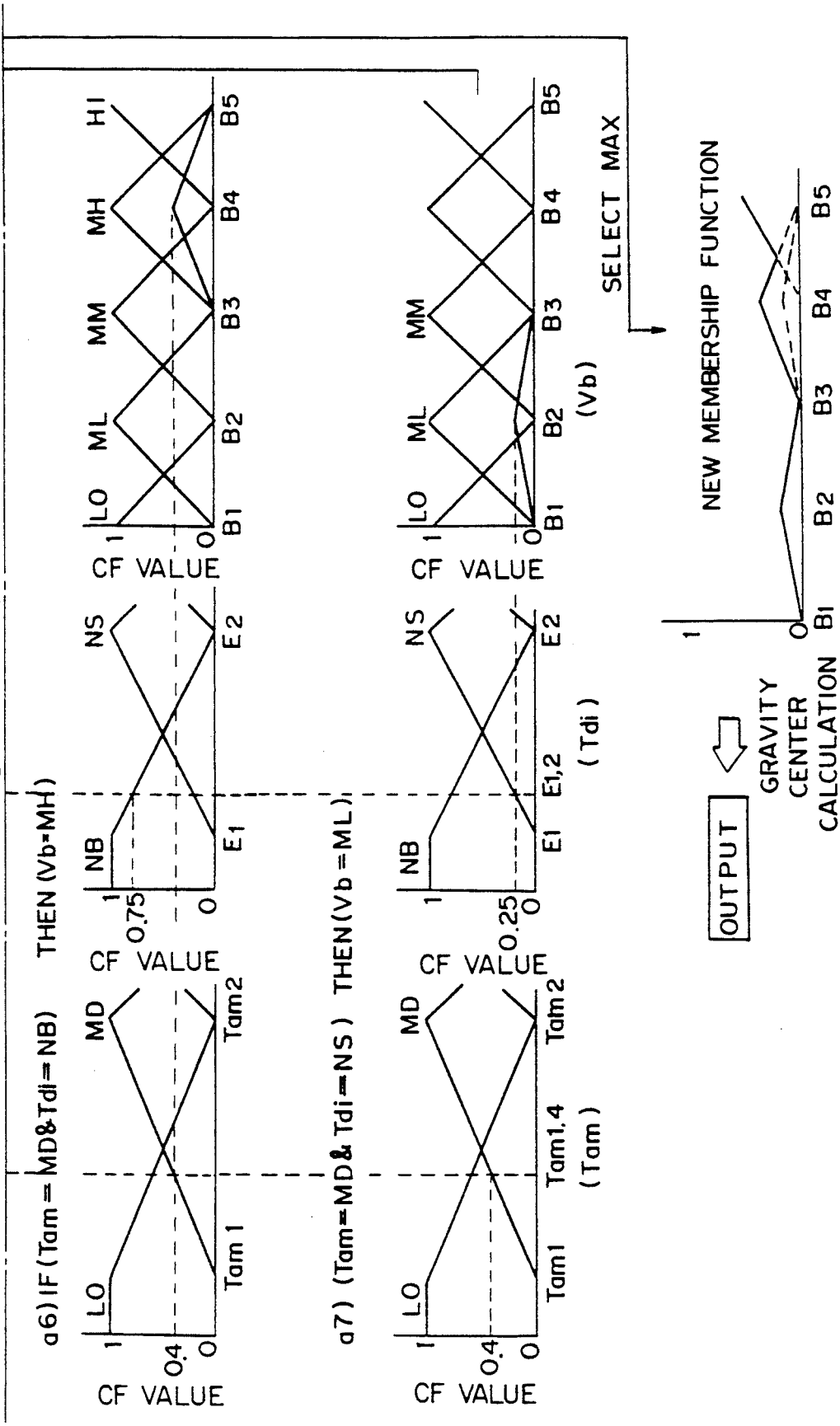
Figure 9:
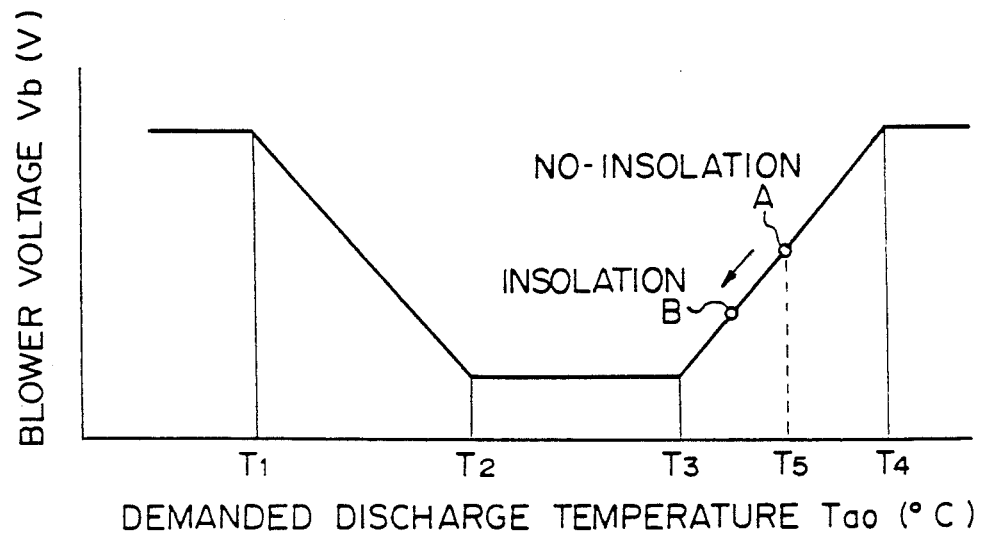
FIG. 9 is a chart showing characteristics of variation of blower voltage relative to a demanded discharge air temperature in the prior art.
Figure 10:
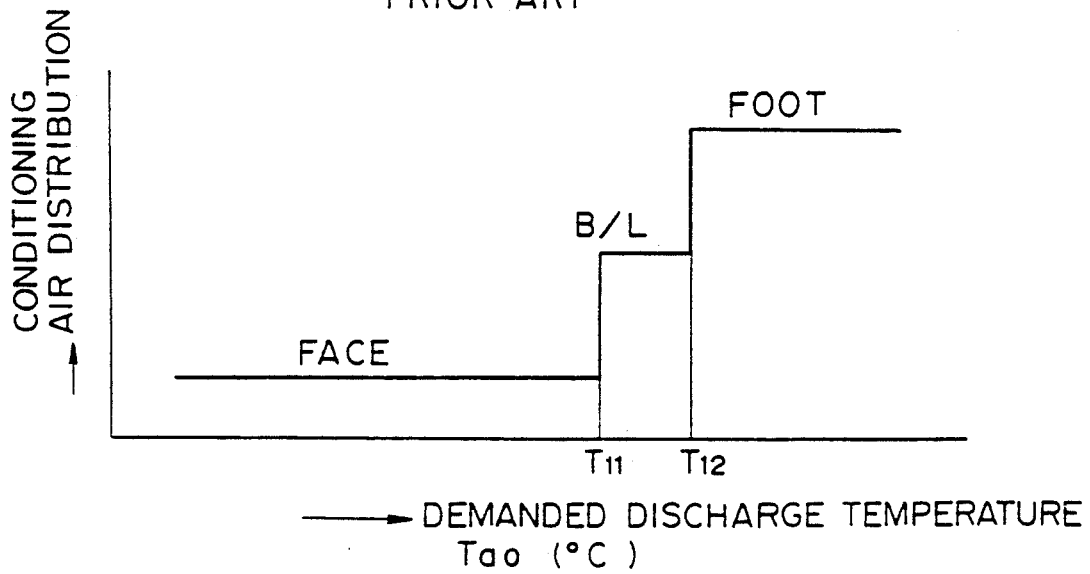
FIG. 10 is a chart showing characteristics for selecting discharge mode relative to the demanded discharge air temperature in the prior art.
Figure 11:
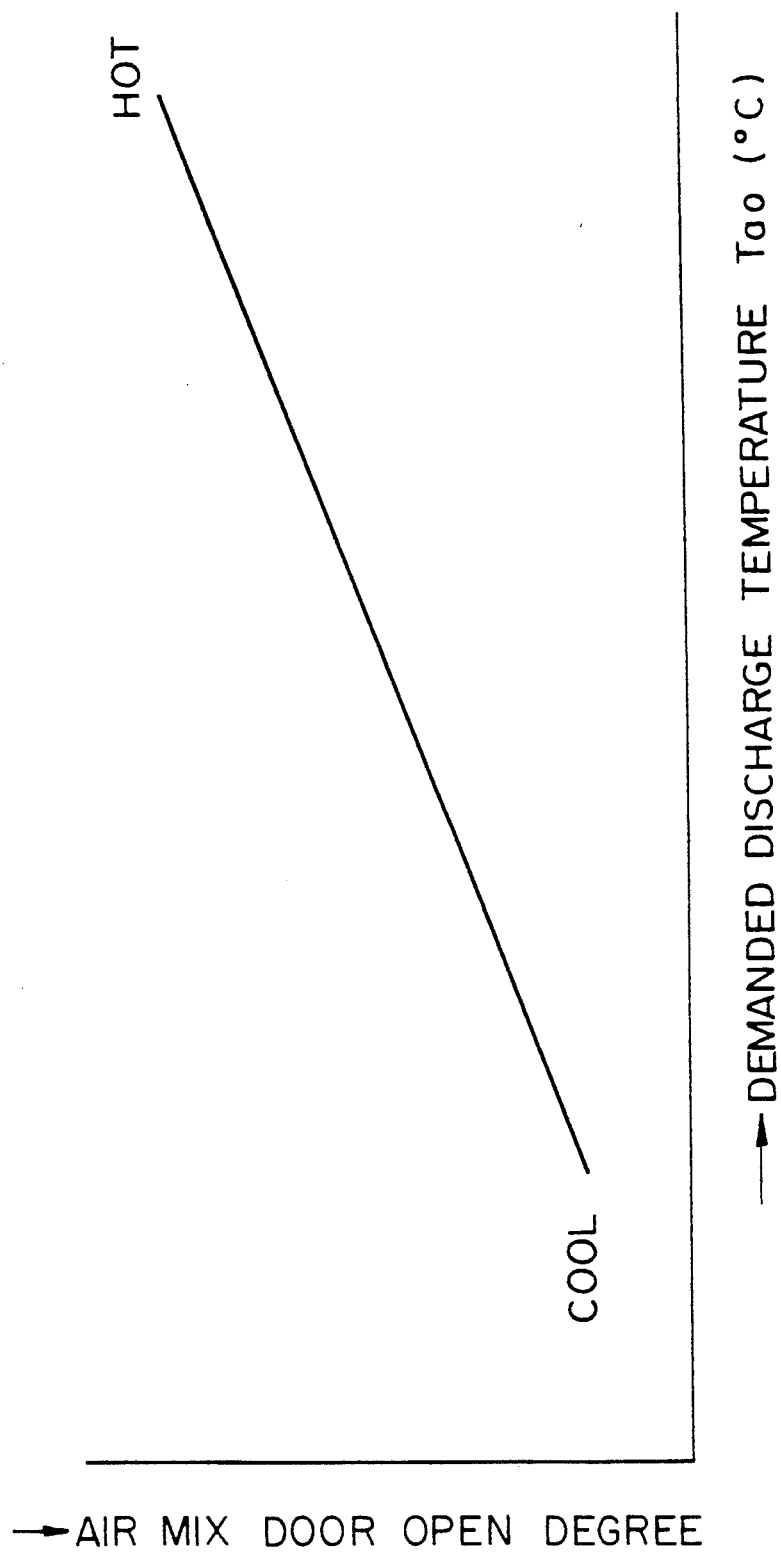
FIG. 11 is a chart showing variation of a position of an air mix door relative to the demandrd discharge air temperature in the prior art.

FIG. 8 shows example of the predication (fuzzy predication) of the target blower voltage Vb in a condition, in which is ambient temperature Tam is Tam 1.4 and the temperature deviation Tdi is E1.2

When the ambient temperature Tam is Tam1.4, the fuzzy aggregate of the ambient temperature Tam meets the two aggregates of LO(LOW) and MD(MEDIUM). On the other hand, when the temperature deviation Tdi is E1.2, the fuzzy aggregate of such temperature deviation meets the two aggregates of NB(Negative Big) and NS(Negative Small).

As can be seen from the foregoing table I, the fuzzy rules commonly including these aggregates LO, MD, NB and NS are the rules identified by a1, a2, a6 and a7. Therefore, these fuzzy rules a1, a2, a6 and a7 are selected. With respect to each of the selected rules, the following process is performed.

As shown in FIG. 8, in the fuzzy rule a1, when the ambient temperature Tam is Tam1.4, the CF value of the fuzzy aggregate becomes 0.6. On the other hand, when the temperature deviation Tdi is E1.2, the CF value of the fuzzy aggregate NB becomes 0.75. Such CF values are derived through the process at the step 310 of FIG. 5.

Next, the CF values of the fuzzy aggregates LO and NB are compared to select smaller ones. Therefore, the CF value 0.6 of the fuzzy aggregate LO is selected and multiplied with the membership function HI(High) of the blower voltage Vb, to derive the weighted membership function HI (shown by thick line). This process corresponds to the processes done through the steps 320 and 330 of FIG. 5.

The same processes are performed with respect to the fuzzy rules a2, a6 and a7, to derive the weighted membership functions MH(Medium High) and ML(Medium Low) which are respectively shown by the thick lines.

Then, all weighted membership functions HI, MH, ML for the blower voltage Vb respectively shown by the thick lines are overlaid to form a summed aggregate. This summed aggregate forms a new membership function for the blower voltage Vb. This process corresponds to the process done through the step 340 of FIG. 5.

Finally, with respect to the new membership function for the blower voltage Vb, the gravity center value G is calculated by the foregoing equation (6). This process corresponds to the process done in the step 350 of FIG. 5. Through the process set forth above, the resultant predicated target value of the blower voltage Vb can be derived.

Next, manner of control of the discharge air temperature at respective seasons, i.e. through spring, summer, fall and winter, in the shown construction of the automotive air conditioner system will be discussed.

[1] At first, discussion will be given for a cool down mode operation in a hot environmental condition, such as in the summer, when the ambient temperature is HI in which Tam is greater than or equal to Tam3, and the insolation intensity is greater than or equal to S3 (in FIG. 6(b) and thus corresponds to PB.

[1a] At first, by high intensity of a sun beam in the summer, the temperature deviation Tdi (=Tr−Tset) is maintained at a positive and relatively large value. Also, the demanded discharge temperature Tao calculated through the foregoing equation (3) represents a substantially low temperature much lower than the set temperature Tset because of high heat load in the summer.

The blower voltage Vb in absence of the insolation is predicated at the step 200. Since the temperature deviation Tdi is greater than E5 and thus becomes PB according to FIG. 6(c). On the other hand, since Tam is HI, the blower voltage Vb becomes HI according to the fuzzy rule a15 in the table I.

On the other hand, the blower voltage increasing magnitude Vup in presence of the insolation is predicated by the foregoing fuzzy logic at the step 210. At this time, since the ambient temperature Tam is HI, the insolation intensity Ts is greater than or equal to S3 and thus is PB, and the temperature deviation Tdi is greater than E5 and thus is PB, the blower voltage increasing magnitude Vup becomes ΔHI according to the fuzzy rule e15 in the table V.

The conditioning air distribution Db in absence of the insolation is predicated at the step 220. At this condition, since the ambient temperature Tam is HI, and the temperature deviation Tdi is PB, the conditioning air distribution Db becomes FACE according to the fuzzy rule (b15) of the table II.

Accordingly, at this condition, the target blower voltage Va, the target conditioning air distribution damper open degree Dap and the discharge air temperature in the automotive air conditioner system can be expressed by the following equations:

From the foregoing equation (1)

$$Va = HI + \Delta HI$$

$$Dap = (HI \times FACE + \Delta HI)/(HI + \Delta HI)$$

From the foregoing equation (4)

$$Tface = MIN(Tao, Tset) + \Delta t$$

[1b] Discussion will be made for the condition where the temperature deviation Tdi is reduced to be E4 after operation of the air conditioner system for a certain period. At this condition, the blower voltage Vb in absence of the insolation is again predicated at the step 200. At this time since the ambient temperature Tam is HI, and the temperature deviation Tdi is E4 and thus is PS, the blower voltage Vb becomes ML according to the fuzzy rule a14 of the table I.

The blower voltage increasing magnitude Vup in the presence of the insolation is predicated at the step 210. At this time, since the insolation Ts is S3 and the temperature deviation is PS, the blower voltage increasing magnitude Vup is derived to be ΔHI according to the fuzzy rule e14 of the table V.

The conditioning air distribution Db in absence of the insolation is predicated at the step 220. At this condition, since the ambient temperature Tam is HI, and the temperature deviation Tdi is PS, the conditioning air distribution Db becomes FACE according to the fuzzy rule b14) of the table II.

Accordingly, at this condition, the target blower voltage Va, the target conditioning air distribution damper open degree Dap and the discharge air temperature in the automotive air conditioner system can be expressed by the following equations:

$$Va = ML + \Delta HI$$

$$Dap = (ML \times FACE + \Delta HI)/(ML + \Delta HI)$$

$$Tface = MIN(Tao, Tset) + \Delta t$$

[1c] Further discussion will be given to the situation in which the further period is elapsed and the temperature deviation becomes E3.

At this condition, the blower voltage Vb without insolation is again predicated at the step 200. At this time since the ambient temperature Tam is HI, and the temperature deviation Tdi is E3 and thus is ZO, the blower voltage Vb becomes LO according to the fuzzy rule a13 of the table I.

The blower voltage increasing magnitude Vup in presence of the insolation is predicated at the step 210. At this time, since the insolation Ts is S3 and the temperature deviation is PB, the blower voltage increasing magnitude Vup is derived to be ΔMH according to the fuzzy rule e13 of the table V.

The conditioning air distribution Db without insolation is predicated at the step 220. At this condition, since the ambient temperature Tam is HI, and the temperature deviation Tdi is ZO, the conditioning air distribution Db becomes FACE according to the fuzzy rule b13 of the table II.

Accordingly, at this condition, the target blower voltage Va, the target conditioning air distribution damper open degree Dap and the discharge air temperature in the automotive air conditioner system can be expressed by the following equations:

$$Va = LO + \Delta MH$$

$$Dap = (LO \times FACE + \Delta MH)/(LO + \Delta MH)$$

$$Tface = MIN(Tao, Tset) + \Delta t$$

[2] Next, discussion for the operation in intermediate temperature weather, such as spring or fall, in which the ambient temperature Tam is Tam2, i.e. MD and the insolation Ts is S2, i.e. PM.

[2a] The demanded discharge temperature Tao calculated through the foregoing equation (3) represents a temperature close to the set temperature Tset because of the intermediate temperature weather.

The blower voltage Vb in absence of insolation is predicated at the step 200. Since the temperature deviation Tdi is greater than E5 and thus becomes PB. Then, the blower voltage Vb becomes MM according to the fuzzy rule a10 in the table I.

On the other hand, the blower voltage increasing magnitude Vup in presence of the insolation is predicated by the foregoing fuzzy logic at the step 210. At this time, since the insolation intensity Ts is S2 and thus is PM, and the temperature deviation Tdi is greater than E5 and thus is PB, the blower voltage increasing magnitude Vup becomes ΔMM according to the fuzzy rule d10 in the table IV.

The conditioning air distribution Db in absence of insolation is predicated at the step 220. At this condition, since the temperature deviation Tdi is PB, the conditioning air distribution Db becomes FACE according to the fuzzy rule (b10) of the table II.

Accordingly, at this condition, the target blower voltage Va, the target conditioning air distribution damper open degree Dap and the discharge air temperature in the automotive air conditioner system can be expressed by the following equations:

$$Va = MM + \Delta MM$$

$$Dap = (MM \times FACE + \Delta MM)/(MM + \Delta MM)$$

$$Tface = MIN(Tao, Tset) + \Delta t$$

[2b] Discussion will be made for the condition where the temperature deviation Tdi is reduced to be E4 after operation of the air conditioner system for a certain period. At this condition, the blower voltage Vb in absence of insolation is again predicated at the step 200. At this time since the temperature deviation Tdi is E4 and thus is PS, the blower voltage Vb becomes ML according to the fuzzy rule a9 of the table I.

The blower voltage increasing magnitude Vup in presence of the insolation is predicated at the step 210. At this time, since the insolation intensity Ts is S2 and the temperature deviation Tdi is E4, the blower voltage increasing magnitude Vup is derived to be ΔMM according to the fuzzy rule d9 of the table IV.

The conditioning air distribution Db in absence of the insolation is predicated at the step 220. At this condition, since the temperature deviation Tdi is PS, the conditioning air distribution Db becomes FE according to the fuzzy rule b9 of the table II. Therefore, the target conditioning air distribution damper open degree Dap is calculated according to the foregoing equation (2) at the step 150 of FIG. 3.

$$Dap = (ML \times FE + \Delta MM)/(MM + \Delta MM)$$

Accordingly, at this condition, the target blower voltage Va, the target discharge mode switching door open degree Dap and the discharge air temperature in the automotive air conditioner system can be expressed by the following equations:

$$Va = ML + \Delta MM$$

$$Dap = (ML \times FE + \Delta MM)/(ML + \Delta MM)$$

$$Tface = MIN(Tao, Tset) + \Delta t$$

$$Tfoot = MAX(Tao, 35° C.)$$

[2c] Further discussion will be given for the occasion in which the further period is elapsed and the temperature deviation becomes E3.

At this condition, the blower voltage Vb without insolation is again predicated at the step 200. At this time since the temperature deviation Tdi is E3 and thus is ZO, the blower voltage Vb becomes LO according to the fuzzy rule a8 of the table I.

The blower voltage increasing magnitude Vup in presence of the insolation is predicated at the step 210. At this time, since the insolation Ts is S2 and the temperature deviation is PM, the blower voltage increasing magnitude Vup is derived to be ΔML according to the fuzzy rule d8 of the table IV.

The conditioning air distribution Db without insolation is predicated at the step 220. At this condition, since the temperature deviation Tdi is ZO, the conditioning air distribution Db becomes B/L according to the fuzzy rule b8 of the table II. Therefore, the target conditioning air distribution damper open degree Dap is calculated according to the foregoing equation (2) at the step 150 of FIG. 3.

$$Dap = (LO \times B/L + \Delta ML)/(LO + \Delta ML)$$

Accordingly, at this condition, the target blower voltage Va, the target discharge mode switching door open degree Dap and the discharge air temperature in the automotive air conditioner system can be expressed by the following equations:

$$Va = LO + \Delta ML$$

$$Dap = (LO \times B/L + \Delta ML)/(LO + \Delta ML)$$

$$Tface = MIN(Tao, Tset) + \Delta t$$

$$Tfoot = MAX(Tao, 35° C.)$$

[3] Next, a discussion for the operation in cold weather, such as winter, in which the ambient temperature Tam is smaller than or equal to Tam1, i.e. LO and the insolation intensity Ts is S1, i.e. PS.

[3a] The demanded discharge temperature Tao calculated through the foregoing equation (3) represents a temperature much higher than the set temperature Tset because of the cold ambient temperature condition.

The blower voltage Vb in without insolation is predicated at the step 200. Since the temperature deviation Tdi is a negative value and smaller then E1 and thus becomes NB. Then, the blower voltage Vb becomes HI according to the fuzzy rule a1 in the table I.

On the other hand, the blower voltage increasing magnitude Vup in the presence of the insolation is predicated by the foregoing fuzzy logic at the step 210. At this time, since the insolation intensity Ts is S1 and thus is PS, and the temperature deviation Tdi is smaller than E1 and thus is NB, the blower voltage increasing magnitude Vup becomes ΔLO according to the fuzzy rule C1 in the table III. Namely, during the warm up period in cold weather, such as in the winter, the blower voltage increasing magnitude in the presence of insolation is set at ΔLO to strictly limit an increase of the discharge rate of the conditioning air.

The conditioning air distribution Db without insolation is predicated at the step 220. At this condition, since the temperature deviation Tdi is NB, the conditioning air distribution Db becomes FOOT according to the fuzzy rule (b1) of the table II.

Accordingly, at this condition, the target blower voltage Va, the target conditioning air distribution damper open degree Dap and the discharge air temperature in the automotive air conditioner system can be expressed by the following equations:

$$Va = HI + \Delta LO$$

$$Dap = (HI \times FOOT \times \Delta LO/(HI = \Delta LO)$$

$$Tfoot = MAX(Tao, 35° C.)$$

[3b] Discussion will be made for the condition where the temperature deviation Tdi is reduced to E3, i.e. ZO, and then then insolation intensity is increased from S1 to S2 and thus varies from PS to PM. At this condition, the blower voltage Vb in absence of the insolation is predicated at the step 200. At this time since the temperature deviation Tdi is E3 and thus is ZO, the blower voltage Vb becomes MM according to the fuzzy rule a3 of the table I.

The blower voltage increasing magnitude Vup in presence of the insolation is predicated at the step 210. At this time, since the insolation intensity Ts is S2 and thus is PM, and the temperature deviation Tdi is E3 and thus is ZO, the blower voltage increasing magnitude Vup is derived to be ΔML according to the fuzzy rule c8 of the table III.

The conditioning air distribution Db without insolation is predicated at the step 220. At this condition, since the temperature deviation Tdi is ZO, the conditioning air distribution Db becomes FE according to the fuzzy rule b3 of the table II.

Therefore, the target conditioning air distribution damper open degree Dap is calculated according to the foregoing equation (2) at the step 150 of FIG. 3.

$$Dap = (MM \times FOOT + \Delta ML)/(MM + \Delta ML)$$

Accordingly, at this condition, the target blower voltage Va, the target discharge mode switching door open degree Dap and the discharge air temperature in the automotive air conditioner system can be expressed by the following equations:

$$Va = MM + \Delta ML$$

$$Dap = (MM \times FOOT + \Delta ML)/(MM + \Delta ML)$$

$$Tface = MIN(Tao, Tset) + \Delta t$$

$$Tfoot = MAX(Tso, 35° C.)$$

[3c] Further discussion will be given for the situation in which the further period is elapsed and the temperature deviation becomes E4.

At this condition, the blower voltage Vb without insolation is again predicated at the step 200. At this time since the temperature deviation Tdi is E4, the blower voltage Vb becomes ML according to the fuzzy rule a4 of the table I.

The blower voltage increasing magnitude Vup in the presence of insolation is predicated at the step 210. At this time, since the insolation Ts is S2 and the temperature deviation Tdi is E4, the blower voltage increasing magnitude Vup is derived to be ΔML according to the fuzzy rule c9 of the table III.

The conditioning air distribution Db without insolation is predicated at the step 220. At this condition, since the temperature deviation Tdi is E4, the conditioning air distribution Db becomes FOOT according to the fuzzy rule b4 of the table II. Therefore, the target conditioning air distribution damper open degree Dap is calculated according to the foregoing equation (2) at the step 150 of FIG. 3.

$$Dap = (ML \times FOOT + \Delta ML)/(ML + \Delta ML)$$

Accordingly, at this condition, the target blower voltage Va, the target discharge mode switching door open degree Dap and the discharge air temperature in the automotive air conditioner system can be expressed by the following equations:

$$Va = ML + \Delta ML$$

$$Dap = (ML \times FOOT + \Delta ML)/(ML + \Delta ML)$$

$$Tface = MIN(Tao, Tset) + \Delta t$$

$$Tfoot = MAX(Tao, 35° C.)$$

As set forth above, according to the shown embodiment of the invention, it becomes possible to resolve the hot feeling of the passengers due to insolation under cold weather, which cannot be solved by the conventional control of the demanded discharge air temperature Tao. Namely, according to the invention, a control algorithm for switching a discharge mode from FOOT mode to BI-LEVEL mode as needed due to insolation despite of relatively low ambient temperature, can be realized by introducing fuzzy logic in the air conditioner control technology.

Furthermore, according to the present invention, during the warm-up period in cold weather, such as in winter, the blower voltage increasing magnitude Vup is limited to the minimum value even in presence of insolation. Namely, according to the algorithm employed in the shown embodiment, the influence of the insolation is minimized during the warm-up period under a low temperature environment.

It should be appreciated, in the fuzzy logic employed in the shown embodiment, the fuzzy rules for the blower voltage Vb without insolation, is set so that the blower voltage becomes high when the ambient temperature is low and the negative temperature difference Tdi shows a large deviation. On the other hand, when the ambient temperature is low and the temperature deviation Tdi is small, i.e. ZO, the medium blower voltage MM is selected. Also, when the ambient temperature is low and the positive temperature deviation Tdi is large PB, the low blower voltage LO is selected. Such characteristics are selected for the cabin temperature slightly higher than the set temperature since it may provide greater comfort in cold weather. In addition, when the ambient temperature Tam is high, such as that in the summer, if the positive temperature deviation Tdi is large, the high blower voltage HI is selected. When the ambient temperature is high and the temperature deviation is small, i.e. ZO, the low blower voltage Vb is selected.

Also, in the fuzzy rules of the table II for conditioning air distribution, FOOT mode is selected when the ambient temperature Tam is low (LO) and the negative temperature deviation Tdi is large (NB); FACE side BI-LEVEL (FT) mode is selected when the ambient temperature Tam is low (LO) and the positive temperature deviation is large (PB); and FACE mode is selected when the ambient temperature Tam is high (HI) and the positive temperature deviation Tdi is large (PB). The characteristics are established since if the cain temperature becomes excessively higher than the set temperature in cold weather, discharge of cool air through the FACE vents 12 will provide greater comfort for the passengers.

In the fuzzy rules for the insolation dependent blower voltage correction in the table III, while the negative temperature deviation is large, the blower voltage increasing magnitude is maintained at minimum value ΔLO irrespective of the intensity of isolation. This assures to prevent relatively cool conditioning air from being discharged through the FACE vent, which can give a cold feeling to the passengers. Therefore, during the period, in which the negative temperature deviation is large, the influence of the insolation dependent blower voltage correction can be minimized. On the other hand, when the temperature deviation becomes small, it may be preferable to discharge relatively cool air in response to the insolation for cooling the upper body of the passengers subjected to irradiation of the sun beams. This is realized by the shown embodiment, by providing a greater blower voltage increasing magnitude in such circumstances.

The fuzzy rules of the tables IV and V are established so that the blow voltage increasing magnitude is increased according to rising of the ambient temperature for providing a greater increasing magnitude than that in the cold weather.

In addition, in the membership functions set forth above, the membership function associated with the ambient temperature of the table I is set at typical values representing spring, spring, fall and winter, and summer.

The membership function associated with the insolation of FIG. 6(b) is set by equally dividing the insolation zero and the possible maximum insolation value.

The membership function associated with the temperature deviation in FIG. 6(c) is set through experiments and adapted to desired feelings.

The membership function associated with the blower voltage in FIG. 6(d), the membership function associated with the conditioning air distribution in FIG. 6(e), the membership function associated with the blower voltage increasing magnitude in presence of the insolation in FIG. 6(f) are respectively set in equal division.

It should be appreciated that membership functions and fuzzy rules used in the shown embodiment may be variably adapted to desired control characteristics. Namely, while the triangular or trapezoidal shape membership functions are employed in the shown embodiment, it is possible to use any configuration of the membership function, such as bell shape and so forth, as long as consistency is maintained.

Discussion will be given hereafter for an alternative embodiment of the air conditioner control system according to the invention. While the former embodiment initially derives the basic value of the blower voltage Vb in the environmental condition where no insolation is present, and makes corrections for the basic value under the presence of the insolation, the alternative embodiment of the air conditioner control system derives the blower voltage and the conditioning air distribution by using presence and absence of the insolation as parameters.

Namely, upon setting of the fuzzy rules, the blower voltage Vb and the conditioning air distribution Db are set by taking the insolation dependent correction into account. This makes it possible to derive the blower voltage Vb and the conditioning air distribution Db at respective single arithmetic operations. Therefore, in the shown embodiment, the blower voltage Vb and the conditioning air distribution Db directly correspond to the target blower voltage Va and the target conditioning air distribution Dap in the former embodiment.

At first, the fuzzy rules employed in the shown embodiment will be explained.

In the shown embodiment, 6 fuzzy rules as shown in the following tables VI to XI are set in terms of the ambient temperature Tam, the insolation intensity Ts and the temperature deviation Tdi on the basis of the membership functions respectively associated with the ambient temperature Tam, the insolation intensity Ts, the temperature deviation Tdi, the blower voltage Vb and the conditioning air distribution Db.

Here, the table VI shows the fuzzy rule of the blower voltage in cold weather, such as in the winter, the table VII shows the fuzzy rules of the blower speed in the intermediate season, such as in spring and fall, and the table VIII shows the fuzzy rule of the blower voltage in hot weather, such as in the summer.

TABLE VI

| | (Blower Voltage in Cold Weather) Tam = LO | | |
|---|---|---|---|
| Ts Tdi | PS | PM | PB |
| NB | HI | HI | MH |
| NS | MM | MM | MM |
| ZO | ML | ML | MM |
| PS | LO | ML | MM |
| PB | LO | ML | MM |

TABLE VII (Blower Voltage in Medium Weather)
Tam = MD

| Ts Tdi | PS | PM | PB |
|---|---|---|---|
| NB | MM | ML | ML |
| NS | ML | LO | ML |
| ZO | LO | ML | MM |
| PS | LO | ML | MM |
| PB | LO | ML | MM |

TABLE VIII (Blower Voltage in Hot Weater)
Tam = HI

| Ts Tdi | PS | PM | PB |
|---|---|---|---|
| NB | LO | LO | LO |
| NS | LO | LO | LO |
| ZO | LO | LO | MM |
| PS | LO | ML | MH |
| PB | MM | MH | HI |

On the other hand, the table IX shows the fuzzy rule of the conditioning air distribution in cold weather, e.g. in the winter, the table X shows the fuzzy rule of the conditioning air distribution in temperature weather, e.g. in spring and/or fall, and the table XI shows the fuzzy rule of the conditioning air distribution in hot weather, e.g. in the summer.

TABLE IX (Conditioning Air Distribution in Cold Weather)
Tam = LO

| Ts Tdi | PS | PM | PH |
|---|---|---|---|
| NB | FOOT | FOOT | FOOT |
| NS | FOOT | FOOT | FT |
| ZO | FOOT | FT | FT |
| PS | FOOT | FT | B/L |
| PB | FT | B/L | B/L |

TABLE X (Conditioning Air Distribution in Medium Weather)
Tam = MD

| Ts Tdi | PS | PM | PH |
|---|---|---|---|
| NB | FOOT | FOOT | FOOT |
| NS | FT | FT | B/L |
| ZO | B/L | B/L | FE |
| PS | FE | FE | FACE |
| PB | FACE | FACE | FACE |

TABLE XI (Conditioning Air Distribution in Hot Weather)
Tam = HI

| Ts Tdi | PS | PM | PH |
|---|---|---|---|
| NB | B/L | B/L | FE |
| NS | FE | FE | FACE |
| ZO | FACE | FACE | FACE |
| PS | FACE | FACE | FACE |
| PB | FACE | FACE | FACE |

Figure 12:
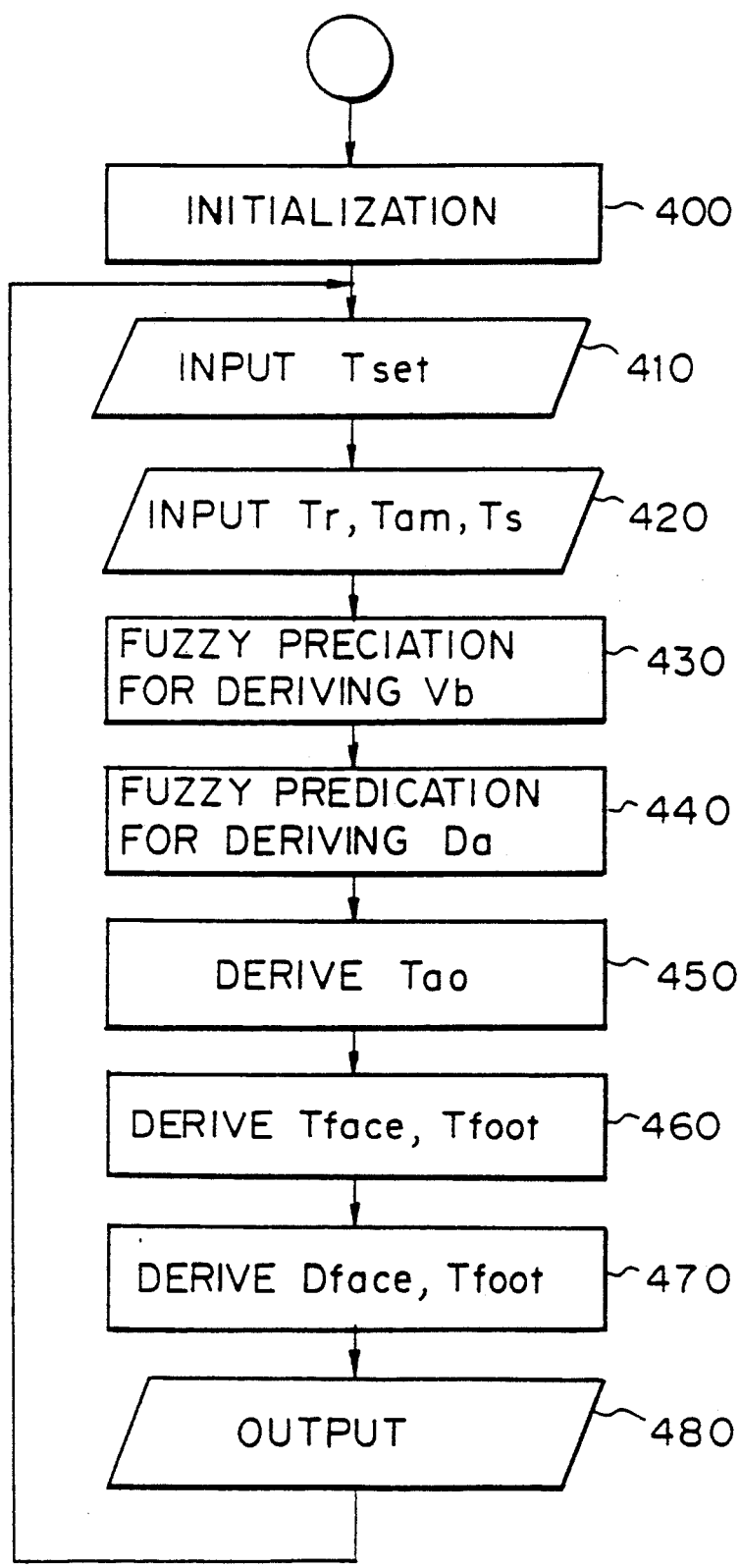
FIG. 12 is a flowchart showing another embodiment of an air conditioner control to be performed by the air conditioner control system.

Next, the process of operation of the control unit using the fuzzy rules of the tables VI to XI and the membership functions will be discussed herebelow with reference to FIG. 12. In the shown routine, the steps 400 to 420 and steps 450 to 480 are respectively the same as those in the steps 100 to 120 and the steps 160 to 190 of FIG. 3 in the former embodiment. Therefore, discussion for these steps is omitted to avoid redundant disclosure.

After processes through the steps 400 to 420, at a step 430, the blower voltage Vb which corresponds to the target blower voltage Va in the former embodiment is derived through the fuzzy predication using the membership functions of FIGS. 6(a) to 6(d) and the fuzzy rules of the tables VI to VIII on the basis of the temperature deviation Tdi, the insolation intensity Ta and the ambient temperature Tam. The manner of fuzzy predication is substantially the same as that discussed in the former embodiment.

At a step 440, the fuzzy predication for deriving the conditioning air distribution Db which corresponds to the target conditioning air distribution Dap in the former embodiment, is performed using the membership functions of FIGS. 6(a) to 6(c) and 6(e) and the fuzzy rules of the tables IX to XI on the basis of the temperature deviation Tdi, the insolation intensity Ts and the ambient temperature Tam. Thereafter, the process of the steps 450 to 480 is performed and subsequently return to the step 410 to periodically repeat the shown routine.

As can be appreciated herefrom, according to the shown embodiment, substantially equivalent control performance can be obtained with reduced process steps to perform fuzzy predication and arithmetic operation.

It should be noted that in the present invention, limitation for increasing magnitude of the blower voltage includes not increasing magnitude and also decreasing the blower voltage.

While the present invention has been disclosed in terms of the preferred embodiments of the invention, the invention can be embodied in various manners and arrangements. It should be thus understood that all of the embodiments and/or modifications that can be implemented without departing from the principle of the invention set out in the appended claims, should be regarded as within a scope of the present invention.

We claim:

1. An air conditioner system for a vehicle comprising:
   a blower driver means for directing air passing an air heating means and/or cooling means toward a vehicular cabin;
   an ambient temperature detecting means for monitoring and detecting ambient air temperature outside of the vehicular cabin;
   an insolation detecting means for detecting the sun beam entering the interior space of the vehicular cabin;
   a warm-up state detecting means for detecting a warm-up condition in which a temperature of a conditioning air to be discharged into said vehicular cabin still being low, and a short period after initiation of discharging of conditioning air; and
   a control means for controlling said blower driver means for adjusting the discharge rate of the conditioning air into the vehicular cabin, said control means increasing the discharge rate according to an increase of intensity of the insolation and responsive to said warm-up state detecting means detecting said warm-up condition, for disabling an increase of the discharge rate irrespective of an increase of the insolation intensity.

2. An air conditioner system as set forth in claim 1, wherein said warm-up state detecting means monitors a range of deviation between an actual temperature within the vehicular cabin and a target cabin temperature for detecting the state falling within a predetermined warm-up state range.

3. An air conditioner system for a vehicle comprising:
   a blower driver means for driving a blower to direct a conditioning air of a controlled temperature toward a vehicular cabin;
   a target temperature setting means for setting a target cabin temperature (Tset);
   a cabin temperature detecting means for detecting a cabin temperature (Tr) in the interior space of the vehicular cabin;
   an ambient temperature detecting means for detecting an ambient air temperature (Tam) outside of the vehicular cabin;
   an insolation detecting means for detecting an amount of the insolation (Ts) by the sun beam entering the interior space of the vehicular cabin;
   a control means for deriving a temperature deviation (Tdi) between said target cabin temperature (Tset) set by said target temperature setting means and said cabin temperature (Tr) detected by said cabin temperature detecting means, deriving a blower control signal for adjusting blower speed and whereby adjusting discharge rate of the conditioning ir into the vehicular cabin on the basis of said temperature deviation (Tdi), the ambient temperature (Tam) detected by said ambient temperature detecting means, and the insolation intensity (Ts) detected by said insolation detecting means in such a manner that the value of said blower control signal is increased according to an increase of the insolation intensity, said control means detecting a warm-up state in which said cabin temperature Tam is lower than a predetermined temperature (HI) and the magnitude of the negative temperature deviation (Tdi) is greater than a predetermined negative deviation value (NS), for limiting said blower control signal value irrespective of increasing said insolation intensity; and
   a blower voltage supply means for applying a blower voltage corresponding to said blower control signal for said blower driver means.

4. An air conditioner system as set forth in claim 1, wherein said control means comprises:
   a memory means storing
      a first fuzzy rule defining a relationship between a first voltage (Vb) applied to said blower driver means, said temperature deviation (Tdi) and said ambient temperature (Tam) when no sun beam entering into the cabin;
      a second fuzzy rule defining a relationship among said temperature deviation, said insolation intensity (Ts), said ambient temperature (Tam) and a second voltage (Vup) for correcting said first voltage upon insolation of the interior space of said vehicular cabin; and
   an arithmetic means for performing fuzzy predication for deriving said first voltage using said first fuzzy rule stored in said memory means in terms of said temperature deviation, said ambient temperature and said insolation intensity, and for performing fuzzy prediction for deriving said second voltage (Vup) using said second fuzzy rule stored in said memory means, said arithmetic means deriving a sum (Va=Vb+Vup) of said first and second voltages (Vb), (Vup) for outputting said blower control signal.

5. An air conditioner system as set forth in claim 1, wherein said control means comprises:
   a memory means for preliminarily storing a fuzzy rule for defining a relationship between said temperature deviation (Tdi), said ambient temperature (Tam), said insolation intensity (Ts) and a charge voltage to be applied to said blower driver means; and
   an arithmetic means for deriving said charge voltage through a fuzzy predication relative to said charge voltage using said fuzzy rule stored in said memory means, on the basis of said temperature deviations, said ambient temperature and said insolation intensity.

6. An air conditioner system for an automotive vehicle comprising:
   a blower driver means for driving a blower for discharging a conditioning air with a controlled temperature and controlled discharge rate into the interior space of a vehicular cabin;
   a target temperature setting means for manually setting a desired target temperature toward which the temperature of the interior space of said vehicular cabin is to be controlled;
   a cabin temperature detecting means for detecting a temperature within the interior space of said vehicular cabin;
   an ambient temperature detecting means for detecting an ambient air temperature external to said vehicular cabin;
   an insolation detecting means for detecting insolation within said vehicular cabin;
   a control means for deriving a temperature deviation between said target temperature and said cabin temperature, and a charge voltage to be applied to said blower driver means on the basis of said temperature deviation, said ambient temperature detected by said ambient temperature detecting means and said insolation intensity detected by said insolation detecting means, said control means increasing said charge voltage according to an increase of said insolation intensity,
   a voltage applying means for applying said charge voltage for controlling said discharge rate of said conditioning air;
   an upper vent for discharging said conditioning air toward the upper portion of the interior space of said vehicular cabin;
   a lower vent for discharging said conditioning air toward the lower portion of the interior space of said vehicular cabin; and
   a conditioning air distribution adjusting means for controlling a proportion of the conditioning air to be discharged through said upper vent and through said lower vent,
   the discharge rate of the conditioning air through said upper vent and said lower bent according to a command for driving the discharge rate through said upper vent and said lower vent,
   wherein said control means being detective of a predetermined condition, in which said ambient temperature (Tam) is higher than a predetermined temperature (LO) and the magnitude of the positive value of said temperature deviation is greater than a predetermined deviation (NS) for generating a command for said conditioning air distribution adjusting means to increase said charge voltage to be applied to said blower driver means according to an increase of said insolation intensity, and setting an increase of the discharge rate through said upper vent.

7. An air conditioner system as set forth in claim 6, wherein said control means further comprises:
a memory means for storing
a first fuzzy rule defining a relationship between said temperature deviation (Tdi), said ambient temperature (Tam) and a first voltage (Vb) to be applied for said blower driver means (15),
a second fuzzy rule defining a relationship between said temperature difference (Tdi), said insolation intensity (Ts), said ambient temperature (Tam) and a second voltage (Vup) for correcting said first voltage (Vb), and
a third fuzzy rule for defining a relationship between said temperature deviation, said ambient temperature, the discharge rate of the conditioning air through said upper vent and the discharge rate of the conditioning air through said lower vent;
an arithmetic means for performing fuzzy predication using said first fuzzy rule stored in said memory means and associated with said first voltage (Vb) for predicating said first voltage in terms of said temperature deviation (Tdi), said ambient temperature (Tam), performing second fuzzy predication using said second fuzzy rule stored in said memory and associated with said second voltage (Vup) for correcting said first voltage for deriving said second voltage in terms of said temperature deviation (Tdi), said insolation intensity (Ts) and said ambient temperature (Tam), and deriving said charge voltage (Va) by summing said first and second voltages; and
a distribution setting means for performing fuzzy predication using said third fuzzy rule stored in said memory and associated with the conditioning air distribution for deriving the condition air distribution through said upper and lower vents.

8. An air conditioner system as set forth in claim 6, wherein said control means comprises:
a memory means for storing
a first fuzzy rule defining a relationship between said temperature deviation, said ambient temperature, said insolation intensity and said charge voltage to be applied to said blower driver means;
a second fuzzy rule defining a relationship between said temperature deviation, said ambient temperature and said proportion of the conditioning air to be discharged through said upper and lower vents;
an arithmetic means for deriving said charge voltage through fuzzy predication using said first fuzzy rule stored in said memory in terms of said temperature deviation, said ambient temperature and said insolation intensity; and
a proportion setting means for deriving a command signal for controlling a proportion of the conditioning air to be discharged through said upper and lower vents through fuzzy predication using said second fuzzy rule stored in said memory means.

* * * * *